(12) United States Patent
Swiderski et al.

(10) Patent No.: US 9,666,095 B2
(45) Date of Patent: May 30, 2017

(54) DEPTH-RELATED HELP FUNCTIONS FOR A WHEEL LOADER TRAINING SIMULATOR

(71) Applicant: Harnischfeger Technologies, Inc., Wilmington, DE (US)

(72) Inventors: Gregory Swiderski, Antioch, IL (US); James Benedict, II, Racine, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 184 days.

(21) Appl. No.: 14/278,545

(22) Filed: May 15, 2014

(65) Prior Publication Data

US 2014/0248589 A1    Sep. 4, 2014

Related U.S. Application Data

(63) Continuation-in-part of application No. 13/625,454, filed on Sep. 24, 2012, now Pat. No. 9,574,326.
(Continued)

(51) Int. Cl.
| | | |
|---|---|---|
| *G09B 9/04* | (2006.01) | |
| *G09B 9/042* | (2006.01) | |
| *E02F 9/20* | (2006.01) | |

(52) U.S. Cl.
CPC ............ *G09B 9/042* (2013.01); *E02F 9/2008* (2013.01)

(58) Field of Classification Search
CPC .... G09B 9/02; G09B 9/04; G09B 9/05; E02F 9/2008
See application file for complete search history.

(56) References Cited

U.S. PATENT DOCUMENTS

| 4,072,945 A | 2/1978 | Katsumata et al. |
| 4,104,634 A | 8/1978 | Gillard et al. |
| (Continued) | | |

FOREIGN PATENT DOCUMENTS

| CA | 2420378 | 3/2002 |
| CN | 101345001 | 1/2009 |
| (Continued) | | |

OTHER PUBLICATIONS

US 5,526,002, 06/1996, Gudat et al. (withdrawn)
(Continued)

*Primary Examiner* — Timothy A Musselman
(74) *Attorney, Agent, or Firm* — Michael Best & Friedrich LLP

(57) ABSTRACT

Methods and systems for training an operator. One system includes a computing device including a processing unit and computer-readable medium. The computer-readable medium stores a training simulator application that is configured to receive an operating command from the operator, generate a simulated working environment and a simulated wheel loader having a simulated bucket, and generate an indicator providing depth-related information to an operator relating to a position of at least a portion of the simulated wheel loader with respect to a point-of-reference within the simulated working environment. The training simulator application is further configured to output the simulated working environment and the indicator for display to the operator, and automatically modify the indicator based on a position of the simulated wheel loader with respect to the point-of-reference.

26 Claims, 24 Drawing Sheets

Related U.S. Application Data

(60) Provisional application No. 61/823,629, filed on May 15, 2013, provisional application No. 61/742,096, filed on Aug. 2, 2012.

(56) References Cited

U.S. PATENT DOCUMENTS

| | | | |
|---|---|---|---|
| 4,261,617 | A | 4/1981 | Dröscher et al. |
| 4,407,388 | A | 10/1983 | Steel |
| 4,419,079 | A | 12/1983 | Georges et al. |
| 4,465,155 | A | 8/1984 | Collins |
| 4,790,402 | A | 12/1988 | Field et al. |
| 4,884,847 | A | 12/1989 | Bessinger et al. |
| 4,920,520 | A | 4/1990 | Göbel et al. |
| 5,170,352 | A | 12/1992 | McTamaney et al. |
| 5,247,306 | A | 9/1993 | Hardange et al. |
| 5,607,205 | A | 3/1997 | Burdick et al. |
| 5,631,658 | A | 5/1997 | Gudat et al. |
| 5,670,962 | A | 9/1997 | Henderson et al. |
| 5,855,344 | A | 1/1999 | Rogers |
| 5,995,037 | A | 11/1999 | Matsuda et al. |
| 5,999,865 | A | 12/1999 | Bloomquist et al. |
| 6,053,737 | A | 4/2000 | Babbitt et al. |
| 6,057,810 | A | 5/2000 | Roell et al. |
| 6,064,926 | A | 5/2000 | Sarangapani et al. |
| 6,351,697 | B1 | 2/2002 | Baker |
| 6,766,311 | B1 | 7/2004 | Wall et al. |
| 6,791,488 | B2 | 9/2004 | Diekhans et al. |
| 6,832,156 | B2 | 12/2004 | Farmer |
| 7,068,211 | B2 | 6/2006 | Oswald et al. |
| 7,250,901 | B2 | 7/2007 | Stephens |
| 7,339,525 | B2 | 3/2008 | Zimmerman et al. |
| 7,734,397 | B2 | 6/2010 | Peterson et al. |
| 7,832,126 | B2 | 11/2010 | Koellner |
| 7,976,310 | B2 * | 7/2011 | Bachelder ............ G05D 1/0072 434/33 |
| 8,014,924 | B2 | 9/2011 | Greiner et al. |
| 8,078,441 | B2 | 12/2011 | Greiner et al. |
| 8,139,108 | B2 | 3/2012 | Stratton et al. |
| 8,315,789 | B2 | 11/2012 | Dunbabin et al. |
| 8,333,592 | B2 | 12/2012 | Swan |
| 8,485,822 | B2 | 7/2013 | Lind |
| 8,758,016 | B1 | 6/2014 | Henriksson |
| 2003/0083818 | A1 | 5/2003 | Tojima |
| 2003/0216895 | A1 | 11/2003 | Ghaboussi et al. |
| 2004/0217851 | A1 | 11/2004 | Reinhart |
| 2006/0216674 | A1 | 9/2006 | Baranov et al. |
| 2007/0192173 | A1 | 8/2007 | Moughler et al. |
| 2007/0282577 | A1 | 12/2007 | Lind |
| 2008/0180523 | A1 | 7/2008 | Stratton et al. |
| 2009/0088979 | A1 | 4/2009 | Koch |
| 2009/0099824 | A1 | 4/2009 | Falash et al. |
| 2009/0099886 | A1 | 4/2009 | Greiner et al. |
| 2009/0259399 | A1 | 10/2009 | Kotejoshyer et al. |
| 2009/0259400 | A1 | 10/2009 | Coats et al. |
| 2009/0259401 | A1 | 10/2009 | Edwards et al. |
| 2009/0326734 | A1 | 12/2009 | Gudat |
| 2010/0194175 | A1 | 8/2010 | Hackelboerger et al. |
| 2011/0074619 | A1 | 3/2011 | Martinez Godoy et al. |
| 2011/0183301 | A1 | 7/2011 | Turner |
| 2011/0249118 | A1 | 10/2011 | Bruno |
| 2012/0098325 | A1 | 4/2012 | Junker et al. |
| 2012/0161493 | A1 | 6/2012 | Junker et al. |
| 2012/0191343 | A1 * | 7/2012 | Haleem ............ G01C 21/3697 701/431 |
| 2012/0212365 | A1 | 8/2012 | Feil |
| 2013/0101968 | A1 | 4/2013 | Grabenstetter et al. |
| 2013/0190966 | A1 | 7/2013 | Collins et al. |
| 2014/0038138 | A1 | 2/2014 | Swiderski et al. |
| 2014/0248589 | A1 | 9/2014 | Swiderski et al. |

FOREIGN PATENT DOCUMENTS

| | | |
|---|---|---|
| CN | 102237008 | 11/2011 |
| CN | 202142207 | 2/2012 |
| DE | 3119180 | 12/1982 |
| DE | 3347389 | 2/1986 |
| DE | 19752686 | 6/1999 |
| WO | WO 93-08552 | 4/1993 |
| WO | 9749081 | 12/1997 |
| WO | 0217044 | 2/2002 |
| WO | 2002021480 | 3/2002 |
| WO | WO 2009052938 | 4/2009 |
| WO | WO 2011113581 | 9/2011 |

OTHER PUBLICATIONS

First Examination Report from the Australian Intellectual Property Office for Application No. 2014202349 date Mar. 27, 2015 (6 pages).
First Office Action from the Chilean Intellectual Property Office for Application No. 2209-2013 date Jul. 15, 2015 (6 pages).
http://www.etechsimulation.com/en/mining.php (2013).
Collins et al., "System and Method for Comparing Power Consumption and Load to Calculate Efficiency," expired U.S. Appl. No. 61/590,198 dated Jan. 24, 2012 (8 pages).
Second Office Action from the Chilean Intellectual Property Office for Application No. 2209-20103 dated Oct. 14, 2015 (6 pages).
First Office Action from the State Intellectual Property Office of the People's Republic of China for Application No. 201420568767.X dated Dec. 24, 2014 (4 pages).
First Office Action from the State Intellectual Property Office of the People's Republic of China for Application No. 201420249683.X dated Aug. 8, 2014 (5 pages).
Office Action from the U.S. Appl. No. 13/625,454 dated Apr. 13, 2015 (4 pages).
Office Action from the U.S. Appl. No. 13/625,454 dated Sep. 25, 2015 (6 pages).
Curso, "Escavadora Hidraulica con Simulador Virtual," May 14, 2008 (41 pages).
Office Action from the U.S. Appl. No. 13/625,454 dated Jan. 13, 2016 (6 pages).
Office Action from the U.S. Appl. No. 14/464,675 dated Feb. 22, 2016 (6 pages).
PCT/US2014/051957 International Search Report and Written Opinion dated Dec. 30, 2014 (9pages).
Squelch A. P., "Virtual reality for mine safety training in South Africa," The Journal of the South African Institute of Mining and Metallurgy (Jul. 2001) vol. 101, No. 4. pp. 209-216. (http://www.saimm.eo.za/Journal/v101 n04p209.pdf).
Ruff, T. M., "Recommendations for Evaluating and Implementing Proximity Warning Systems on Surface Mining Equipment," CDC Workplace Safety and Health, 2007, RI 9672 Report of Investigations, 94 pages.
Ralston, J. C. et al., "Recent advances in remote coal mining machine sensing, guidance, and teleoperation," Robotica, 2001, vol. 19, Issue 05, pp. 513-526.
Khrebtov, P. et al., "A Wireless Location System for Sensing the Relative Position between Mining Vehicles," Instrumentation and Measurement Technology Conference Proceedings, 2007, 5 pages.
Ruff, T. M., "Test Results of Collision Warning Systems for Surface Mining Dump Trucks," NIOSH, 2000, RI9652 Report of Investigations, 50 pages.
Nienhaus, K. et al., "Wireless sensing applications in the mining and minerals industry," Proceedings of the 2009 IEEE MTT-S International Microwave Workshop on Wireless Sensing, Local Positioning, and RFID (IMWS), 2009, 4 pages.
Schmitz, R. et al., "Conveyor belt muck built-up detection and messaging system," Transactions of the Institutions of Mining and Metallurgy, Section A: Mining, 2008, 111-115.
Joy Mining Machinery, Support Control Centre—Rev01, Mountain Laurel, Roof Supports, RS20s (2007) TELS0405-0506, 107 pages.
Joy Mining Machinery, Face End Automation, Mountain Laurel, Roof Supports, RS20s (2007) TELS0406-0506, 26 pages.
Joy Mining Machinery, Shearer Initiated Control, Mountain Laurel, Roof Supports, RS20s (2007) TELS0408-0506, 34 pages.
Joy Mining Machinery, Free Running Control—Rev02, Mountain Laurel, Roof Supports, RS20s (2007) TELS0407-0506, 58 pages.

(56) References Cited

OTHER PUBLICATIONS

Joy Mining Machinery, System, Mountain Laurel, Roof Supports, RS20s (2007) TELS0404-0506, 88 pages.
Joy Mining Machinery, Two-Way Remote Operation, Beltana, FaceBoss Shearer 7LS6 LWS646 (2009) TJLW1248-0409, 40 pages.
Office Action from the U.S. Appl. No. 13/625,454 dated Dec. 23, 2014 (6 pages).
Abstract of Williams et al., "The Development of an Intelligent Haulage Truck Simulator for Improving the Safety of Operation in Surface Mines," Virtual Worlds, Lecture Notes in Computer Science, 1998, vol. 1434, pp. 337-344.
Harris et al., "Software Specification of a Mining Truck Simulator and Trainer," International Conference on Software Engineering Research and Practice, Conference date Jun. 23 Jun. 26, 2003.
Abstract of Tao et al., "A Low-Cost Solution for Excavator Simulation With Realistic Visual Effect," IEEE Conference on Robotics, Automation and Mechatronics, Conference dates Sep. 21-Sep. 24, 2008, pp. 889-894.
Abstract of Zhang et al., "Surface Mine System Simulation and Safety Risk Management," Journal of China University of Mining and Technology, 2006, vol. 16, issue 4, pp. 413-415.
Kizil, "Virtual reality applications in the Australian minerals industry," Operations Research, South African Institute of Mining and Metallurgy, 2003, vol. S31, p. 569-574.
Tichon et al., "A review of virtual reality as a medium for safety related training in mining," Journal of Health and Safety, Research and Practice, Jul. 2011, vol. 3, issue 1, pp. 33-40.
Kizil et al., "What can Virtual Reality do for Safety?" Queensland Mining Industry Health and Safety, Conference on Managing Safety to Have a Future, Aug. 26-Aug. 29, 2001, pp. 173-181.
"Training Simulators for the Mining Industry," Fifth Dimensions Technologies, Date?, Retrieved from the Internet on Jan. 17, 2013 <URL: http://mining.5dt.net/downloads/5dtsw/Mining_Photo_Overview.pdf>.
"SimControl Software," Immersive Technologies, DATE?, Retrieved from the Internet on Jan. 17, 2013 <URL: http://www.immersivetechnologies.com/products-services/simcontrol.htm>.
"PRO3-B Transportable," Immersive Technologies, DATE?, Retrieved from the Internet on Jan. 17, 2013 <URL: http://www.immersivetechnologies.com/products-services/pro3t.htm>.
"Simulator Base Unit (6-DOF)," ThoroughTec Pty. Ltd., DATE?, Retrieved from the Internet on Mar. 16, 2012<URL: http://www.thoroughtec.com/cybermine/surface-mining-simulator/simulator-base-unit-6-dof.html>.
"Hydraulic Excavator Simulator," Caterpillar Inc., Date?, Retrieved from the Internet on Jan. 17, 2013 <URL: http://www.cat.com/cda/layout?f=235243&m=174681&x=7>.
Lucas, "Improving Conveyor Belt Safety Training Through the Use of Virtual Reality," Thesis submitted to the faculty of the Virginia Polytechnic Institute and State University in partial fulfillment of the requirements for the degree of Master of Science in Building Construction Management, 2008, 125 pages.
"Heavy Equipment Simulators," Caterpillar Inc., Date?, Retrieved from the Internet on Mar. 15, 2012 <URL: http://www.cat.com/simulators>.

"Mining Training Simulators—Index," Go Geometry, Date?, Retrieved from the Internet on Mar. 15, 2012 <URL: http://gogeometry.com/mining/mining_training_simulator_index.html>.
"Caterpillar Mining Training Simulators," Caterpillar Inc., Date?, Retrieved from the Internet on Mar. 15, 2012 <URL: http://www.immersivetechnologies.com/products-services/caterpillar.htm.
"Conversion Kits," Immersive Technologies, Date?, Retrieved from the Internet on Mar. 15, 2012 <URL: http://www.immersivetechnologies.com/products-services/conversionkit.htm>.
"Haul Truck Simulators," Vista Training, Inc., 2009.
"Training Solutions for: Heavy Equipment, Construction & Mining," Vista Training, Inc., 12th Edition Catalog, 2009.
"PC Based Equipment Simulators," Vista Traning, Inc., Date?, Retrieved from the Internet on Mar. 15, 2012 <URL: http://www.vista-training.com/html/equipment_simulators.html>.
"Image Captions and Descriptions for the 5DT Dragline Training Simulator," P. Olckers, Oct. 17, 2002.
"Image Captions and Descriptions for the 5DT Range of Mining Training Simulators," P. Olckers, Oct. 17, 2002.
"Excavator Simulator—New Version Adds 40% New Learning material," Vista Training, Inc., Date? Retrieved from the Internet on Jan. 18, 2013 <URL: http://www.vista-training.com/training/simulators/excavator>.
"Simulators—Frequently Asked Questions," Vista Training, Inc., Date? Retrieved from the Internet on Jan. 18, 2013 <URL: http://www.vista-training.com/training/simulators/faqs>.
First Office Action from the Australian Intellectual Property Office for Application No. 2013209300 date Jul. 6, 2015 (4 pages).
First Office Action from the Chilean Intellectual Property Office for Application No. 1284-2014, first known to us Jan. 26, 2016, (7 pages, which includes English Statement of Relevance).
e-tech Simulation, "Mining Simulators — Wheel Loader Simulator," <web.archive.org/web/20120312043814/http://www.etechsimulation.com/en/miningsim.php>, available Mar. 12, 2012 per Wayback Machine.
Third Examination Report from the Australian Intellectual Property Office for Application No. 2014202349 dated Mar. 17, 2016 (7 pages).
http://immersivetechnologies.com/products-services/High-Fidelity-Training-Simulators-for-Surface-and-Underground-Mining.htm Sep. 22, 2013.
First Office Action from the Chilean Intellectual Property Office for Application No. 02632-2014, first known to us May 12, 2016, (13 pages, which includes English Statement of Relevance).
Second Office Action from the Chilean Intellectual Property Office for Application No. 2214-001286 dated Jul. 29, 2016 (7 pages).
Office Action from the U.S. Appl. No. 13/625,454 dated Jul. 29, 2016 (12 pages).
Office Action from the U.S. Appl. No. 14/447,299 dated Jul. 14, 2016 (7 pages).
Office Action from the U.S. Appl. No. 14/447,299 dated Oct. 7, 2016 (10 pages).
Second Office Action from the Chilean Intellectual Property Office for Application No. 002632-2014, first known to us Nov. 28, 2016, (13 pages, which includes English Statement of Relevance).
Second Examination Report from the Australian Intellectual Property Office for Application No. 2014202349 dated Sep. 11, 2015 (2 pages).

\* cited by examiner

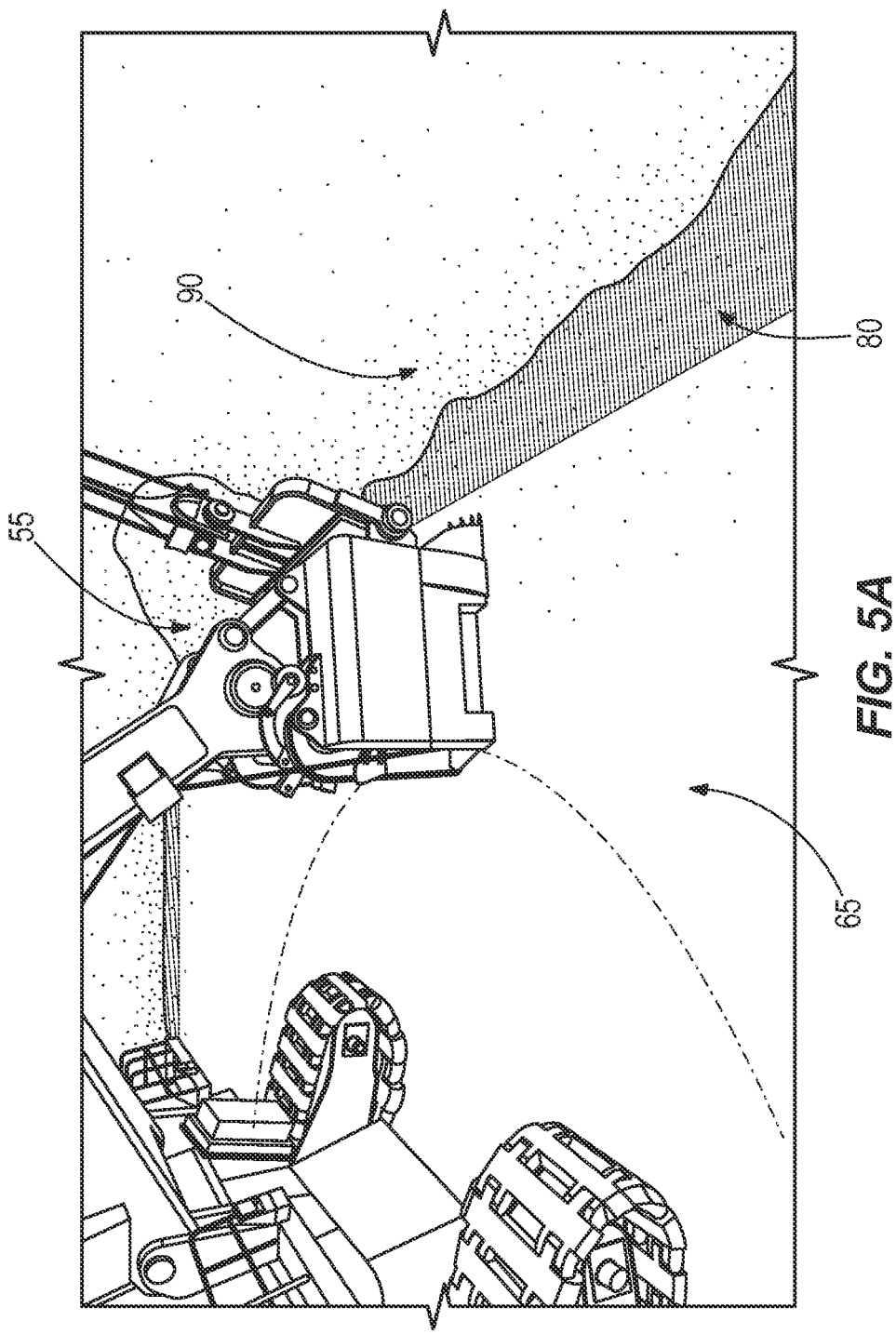

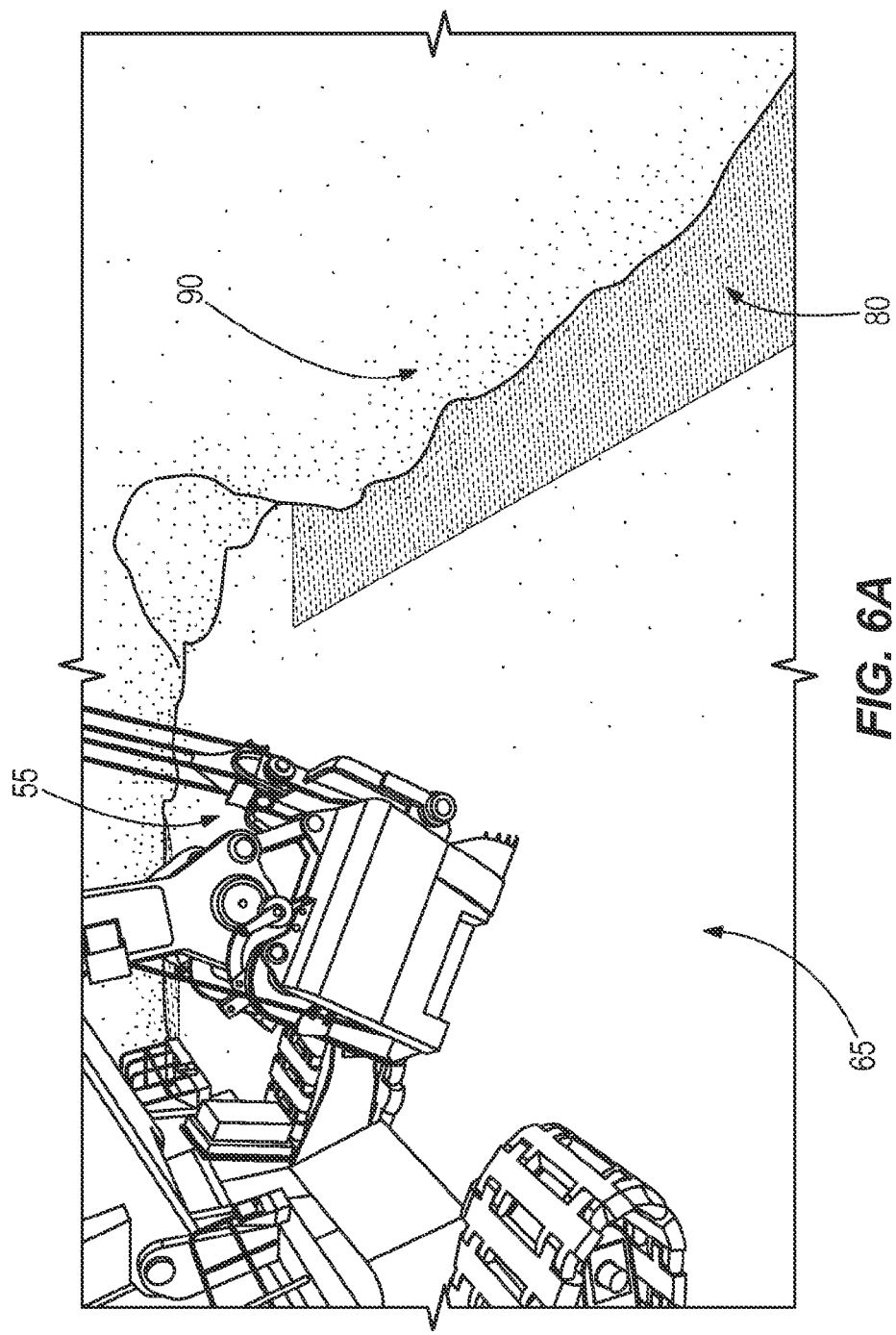

DEPTH-RELATED HELP FUNCTIONS FOR A WHEEL LOADER TRAINING SIMULATOR

RELATED APPLICATIONS

This application claims priority to U.S. Provisional Application No. 61/823,629 filed May 15, 2013 and is a continuation-in-part of U.S. application Ser. No. 13/625,454 filed Sep. 24, 2012, which claims priority to U.S. Provisional Application No. 61/742,096, filed Aug. 2, 2012. The entire content of each of the above-identified application is incorporated by reference herein.

BACKGROUND

This invention relates to methods and systems for training operators of industrial machines, such as shovels and wheel loaders in a simulated environment.

SUMMARY

Industrial machines, such as electric rope or power shovels, draglines, wheel loaders, etc., are used to execute digging operations to remove material from, for example, a bank of a mine. For example, an operator controls a shovel or a wheel loader during a dig operation to load a dipper with materials. The operator deposits the materials in the dipper into a haul truck. After unloading the materials, the dig cycle continues and the operator swings the dipper back to the bank to perform additional digging.

Given the high cost of the industrial machines and the value of efficient and cost-effective operation of the machines, properly training an operator is important. However, based on these same parameters, providing real-world or on-site training for operators is difficult. Therefore, computer-based training simulators can be used to train operators. Computer-based simulators generate a simulated training environment that provides a simulated machine, such as a simulated shovel and/or a simulated wheel loader, and a simulated working environment. The training environment is displayed on at least one monitor or screen. The monitor or screen, however, is two-dimensional. Therefore, it is difficult to provide proper depth perspectives within the training environment. Even when the training environment is generated and displayed in three-dimensions (using computer-based technology), the two-dimensional nature of the monitor or screen limits the ability to properly display depth.

Depth is an important aspect of operating an industrial machine in a real-world environment. For example, when operating a shovel, an operator must properly position the dipper with respect to the bank to prevent digging beneath the level-grade plane of the bank. In addition, an operator must properly position the dipper over the bed of the haul truck to ensure materials in the dipper are deposited into the truck. Similarly, when operating a wheel loader, an operator must properly position the wheel loader's bucket with respect to a haul truck and must keep a level when digging. Furthermore, when operating the wheel loader, an operator controls various operations of the bucket (e.g., height, position, angle, etc.) that must be performed properly to ensure proper operation of the wheel loader. Without having proper depth perspectives for these tasks, a training simulator may not properly train an operator to perform these and other tasks with a shovel or a wheel loader.

Therefore, embodiments of the invention provide methods for training an operator of a shovel. One method includes generating, with a processor, a simulated training environment including a simulated shovel having a simulated dipper and displaying an indicator within the simulated training environment marking at least a portion of a low-grade plane. The method also includes determining if at least a portion of the simulated dipper is below the low-grade plane based on a position of the dipper within the simulated training environment, and, when at least a portion of the simulated dipper is below the low-grade plane, providing at least one warning to an operator of the simulated shovel.

Another method includes generating, with a processor, a simulated training environment including a simulated haul truck and a simulated shovel having a simulated dipper and displaying an indicator within the simulated training environment of at least a portion of a swing path of the simulated dipper. The method also includes determining if the simulated dipper is positioned within a predetermined distance from the simulated haul truck, and alerting the operator when the simulated dipper is positioned within the predetermined distance from the simulated haul truck.

A further embodiment of the invention provides a system for training an operator. The system includes a computing device including a processing unit and computer-readable medium. The computer-readable medium stores a training simulator application. The training simulator application, when executed by the processing unit, is configured to (i) receive an operating command from the operator, (ii) generate a simulated working environment and a simulated shovel having a simulated dipper, the simulated shovel and the simulated dipper positioned within the simulated working environment based on the operating command, (iii) generate an indicator providing depth-related information to an operator relating to a position of the simulated dipper with respect to a point-of-reference within the simulated working environment, and (iv) output the simulated working environment and the indicator to at least one output device for display to the operator.

Yet another embodiment of the invention provides a method for training an operator of a wheel loader. The method includes generating, with a processor, a simulated training environment including a simulated haul truck and a simulated wheel loader having a simulated bucket, and displaying an indicator within the simulated training environment marking a recommended maneuver of the simulated wheel loader to interact with the simulated bucket. The method also includes determining if the simulated wheel loader is following the recommended maneuver, and, when the simulated wheel loader is not following the recommended maneuver, providing at least one warning to an operator of the simulated wheel loader.

An embodiment of the invention also provides a method for training an operator of a wheel loader that includes generating, with a processor, a simulated training environment including a simulated haul truck and a simulated wheel loader having a simulated bucket, and, when an operator operates the simulated wheel loader to load material into the simulated bucket, displaying an indicator within the simulated training environment marking a recommended angle of the simulated bucket. The method also includes determining if the simulated bucket is positioned at the recommended angle, and alerting the operator when the simulated bucket is not positioned at the recommended angle.

In addition, an embodiment of the invention provides a system for training an operator. The system includes a computing device that includes a processing unit and computer-readable medium. The computer-readable medium stores a training simulator application that, when executed by the processing unit, is configured to receive an operating command from the operator, generate a simulated working environment and a simulated wheel loader having a simulated bucket, wherein the simulated wheel loader and the simulated bucket positioned within the simulated working environment based on the operating command, and generate an indicator providing depth-related information to an operator relating to a position of at least a portion of the simulated wheel loader with respect to a point-of-reference within the simulated working environment. The training simulator application is further configured to output the simulated working environment and the indicator to at least one output device for display to the operator, and automatically modify at least one selected from the group comprising a color, size, shape, pattern, and animation of the indicator based on a position of the simulated wheel loader with respect to the point-of-reference.

Other aspects of the invention will become apparent by consideration of the detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 5a-c and 6a-b are screen shots illustrating a level-grade detection function generated by the system of FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, the methods, operations, and sequences described herein can be performed in various orders. Therefore, unless otherwise indicated herein, no required order is to be implied from the order in which elements, steps, or limitations are presented in the detailed description or claims of the present application. Also unless otherwise indicated herein, the method and process steps described herein can be combined into fewer steps or separated into additional steps.

In addition, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "controllers" described in the specification can include standard processing components, such as one or more processors, one or more computer-readable medium modules, one or more input/output interfaces, and various connections (e.g., a system bus) connecting the components.

Figure 1:
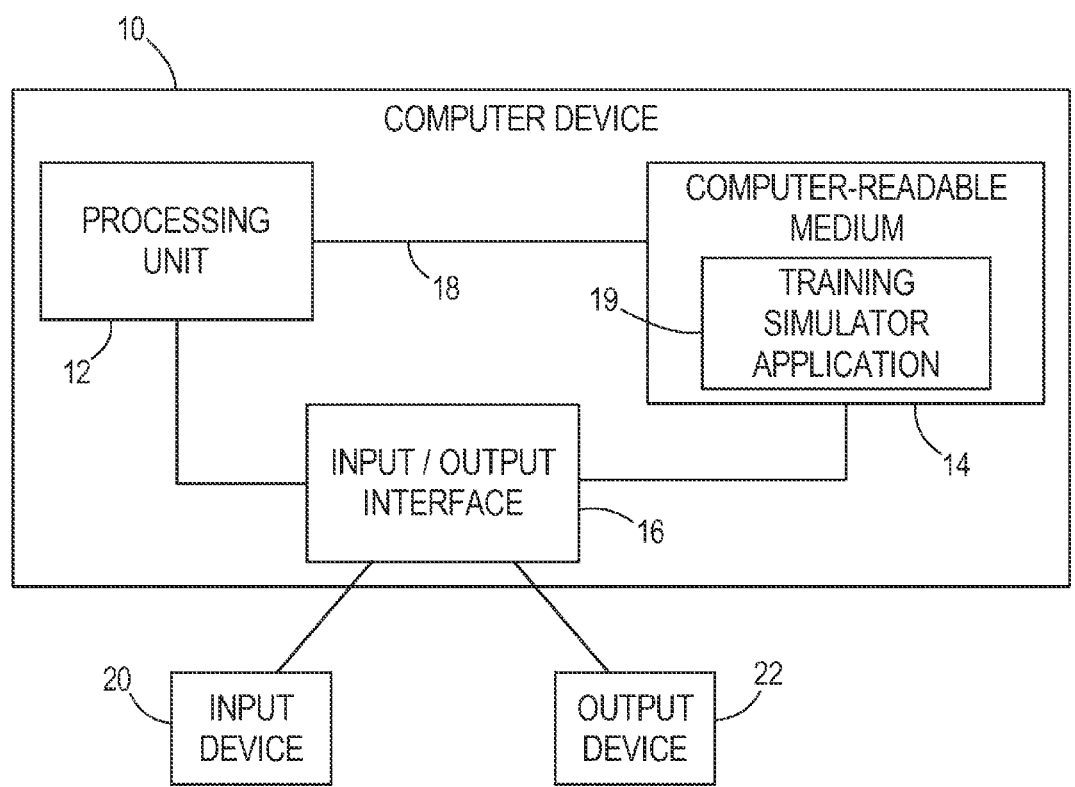
FIG. 1 illustrates a system for training an operator according to an embodiment of the invention.

FIG. 1 illustrates a system for training an operator according to an embodiment of the invention. The system includes a computing device 10 including combinations of hardware and software operable to, among other things, generate a simulated training environment that provides a simulated shovel and a simulated working environment. As illustrated in FIG. 1, the computing device 10 includes, among other things, a processing unit 12 (e.g., a microprocessor, a microcontroller, or another suitable programmable device), non-transitory computer-readable medium 14, and an input/output interface 16. The processing unit 12, the medium 14, and the input/output interface 16 are connected by one or more control and/or data buses (e.g., a common bus 18). The control and/or data buses are shown generally in FIG. 1 for illustrative purposes.

It should be understood that in other constructions, the computing device 10 includes additional, fewer, or different components. It should also be understood that the computing device 10 can include a general purpose computer that executes various modules or applications stored in the medium 14. In other embodiments, the computing device 10 includes a server that executes various modules or applications, and other devices connect to the server (e.g., over at least one network) to provide input to and access output from the server. In still other embodiments, the computing device 10 is a dedicated device providing simulated training and is included as part of a console that includes mock shovel interiors mounted on a platform to simulate an actual shovel.

The computer-readable medium 14 stores program instructions and data and, in particular, stores a training simulator application 19. The processing unit 12 is configured to retrieve the application 19 from the medium 14 and execute the application 19 to generate a simulated training environment that includes a simulated machine, such as a shovel and/or a wheel loader, and a simulated working environment as described below. The input/output interface 16 transmits data from the computing device 10 to external systems, networks, and/or devices and receives data from external systems, networks, and/or devices. The input/output interface 16 can also store data received from external sources to the medium 14 and/or provide the data to the processing unit 12.

As illustrated in FIG. 1, the input/output interface 16 communicates with at least one input device 20. The input device 20 can include a device controlled by an operator to issue operating commands for the simulated machine (e.g., propel shovel, swing dipper, hoist dipper, crowd dipper, dump materials from dipper, etc.) and/or select operating parameters for the simulated working environment (e.g., camera view, shovel type, mine type, weather, time of day, etc.). For example, the input device 20 can include a keyboard, a joystick, a mouse, a touchscreen, a trackball, tactile buttons, a pedal, etc. In some embodiments, the input device 20 includes similar control devices as included in an actual machine. The input device 20 can be connected to the computing device 10 via one or more wired connections (e.g., a universal serial bus ("USB") cable) and/or wireless connections. In some embodiments, when the computing device 10 acts as a server that hosts the training simulator, the input device 20 includes a computing device that accesses the server over at least one network (e.g., a local area network ("LAN") or the Internet).

The input/output interface 16 also communicates with at least one output device 22. The output device 22 can include at least one monitor or screen (e.g., a liquid crystal display ("LCD") monitor) that displays the generated simulated training environment to the operator. In some embodiments, the output device 22 includes multiple screens that provide the operator with a wide view of the training environment. The output device 22 can also include a projector that projects the generated training environment on at least one surface. The output device 22 can also include a device that provides audible or tactile feedback to the operator. For example, the output device 22 can include one or more speakers that provide audible warnings or realistic worksite sounds to the operator. The output device 22 can also include a vibration device that provides tactile feedback to the operator (e.g., indicating a collision or impact). In some embodiments, the output device 22 also includes a movable chair that moves (e.g., using hydraulic mechanisms) to provide the operator with a realistic training experience. As described above for the input device, the output device 22 can be connected to the computing device 10 via one or more wired connections and/or wireless connections.

It should be understood that in some embodiments a device can be connected to the input/output interface 16 that operates as both an input device 20 and an output device 22. For example, a touchscreen can be used that displays a simulated training environment to an operator and receives commands or selections from the operator. In addition, when the computing device 10 operates as a server that hosts the training simulator application 19, devices accessing the server operate as both an input device 20 and an output device 22.

Figure 2:
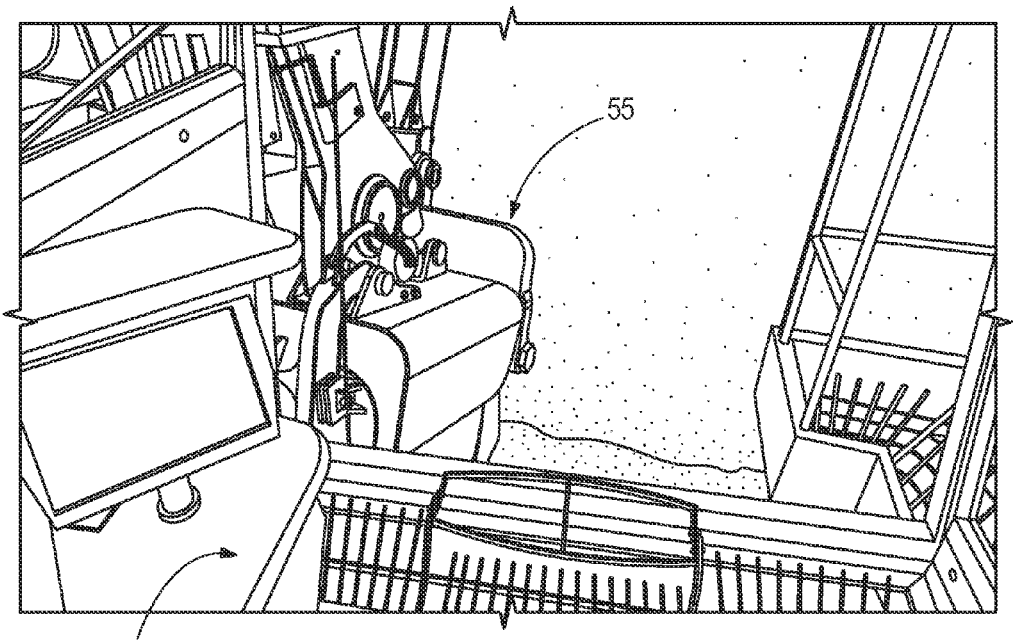
FIGS. 2-4 are screen shots illustrating a simulated training environment generated by the system of FIG. 1.
Figure 3:
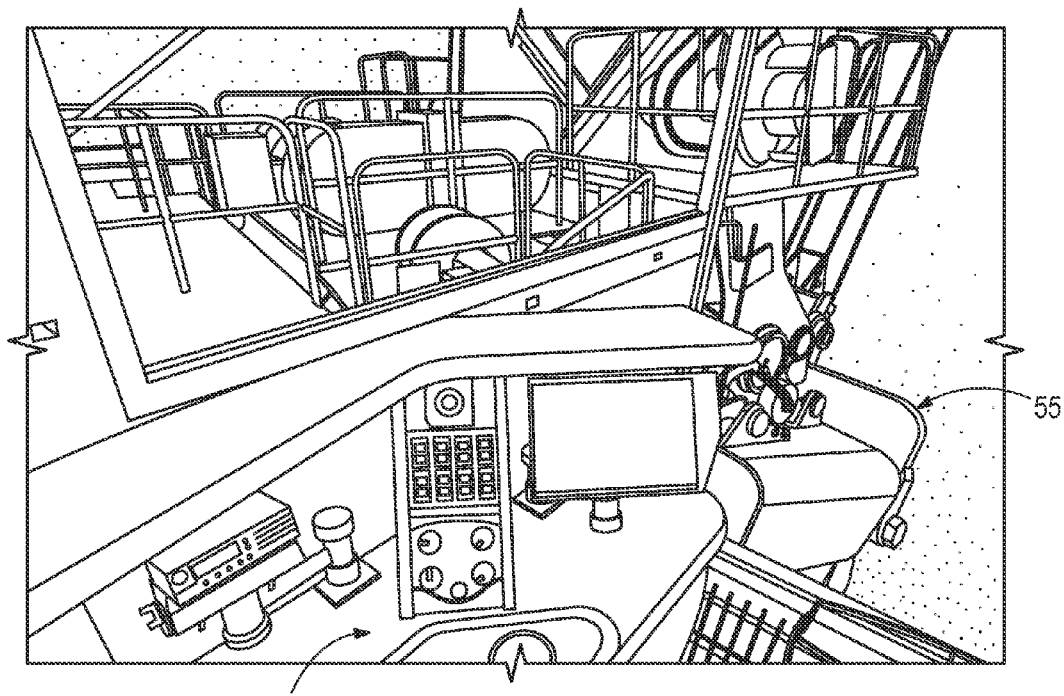
Figure 4:
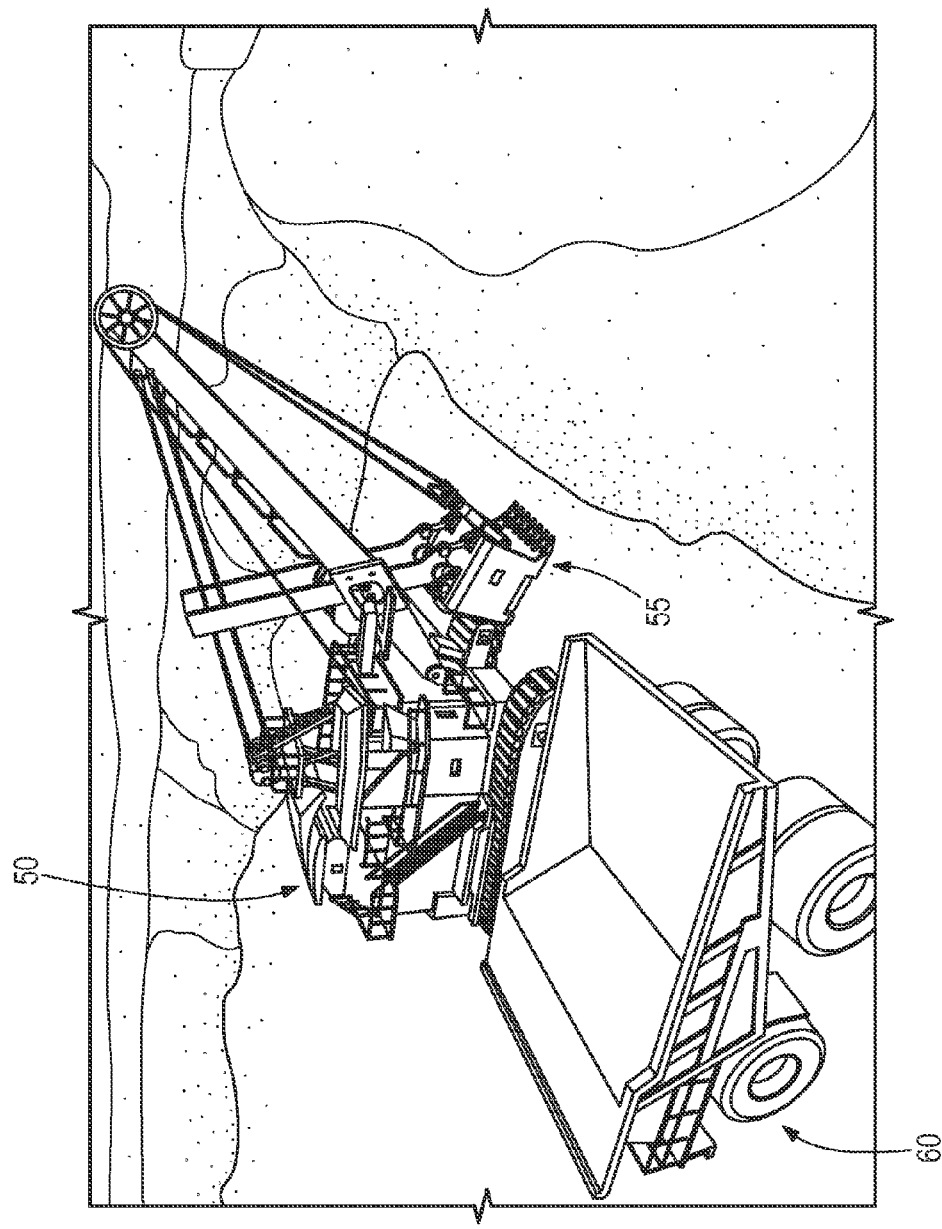

As mentioned above, the computing device 10 executes the training simulator application 19 to generate a simulated training environment. FIGS. 2-4 are screen shots illustrating a simulated training environment generated by the application 19 according to embodiments of the invention. As illustrated in FIGS. 2-4, the training environment can include a simulated shovel 50, which includes a simulated dipper 55. The simulated shovel 50 is displayed within a simulated working environment (e.g., a simulated surface mine), which can include other vehicles and objects, such as a simulated haul truck 60. As illustrated in FIGS. 2-4, the application 19 can display the simulated training environment from multiple camera views or perspectives.

To provide depth perspectives within the simulated training environment, the application 19 includes instructions and data for providing various depth-related help functions. The help functions provide various indicators (e.g., visual, audible, tactile, etc.) within the simulated training environment to aid the operator in judging depth and operating the shovel 50 accordingly. One help function provided by the application 19 includes a level-grade detection function. The level-grade detection function detects when an operator is digging with the simulated dipper 55 beneath the level-grade plane 65 (e.g., the ground the shovel 50 sits on) within the simulated training environment. In a real-world situation, if an operator digs lower than the level-grade plane, a ditch is formed in the ground supporting the shovel and the shovel can sink into the ditch, which creates an unsafe situation for the operator and the shovel.

Figure 5B:
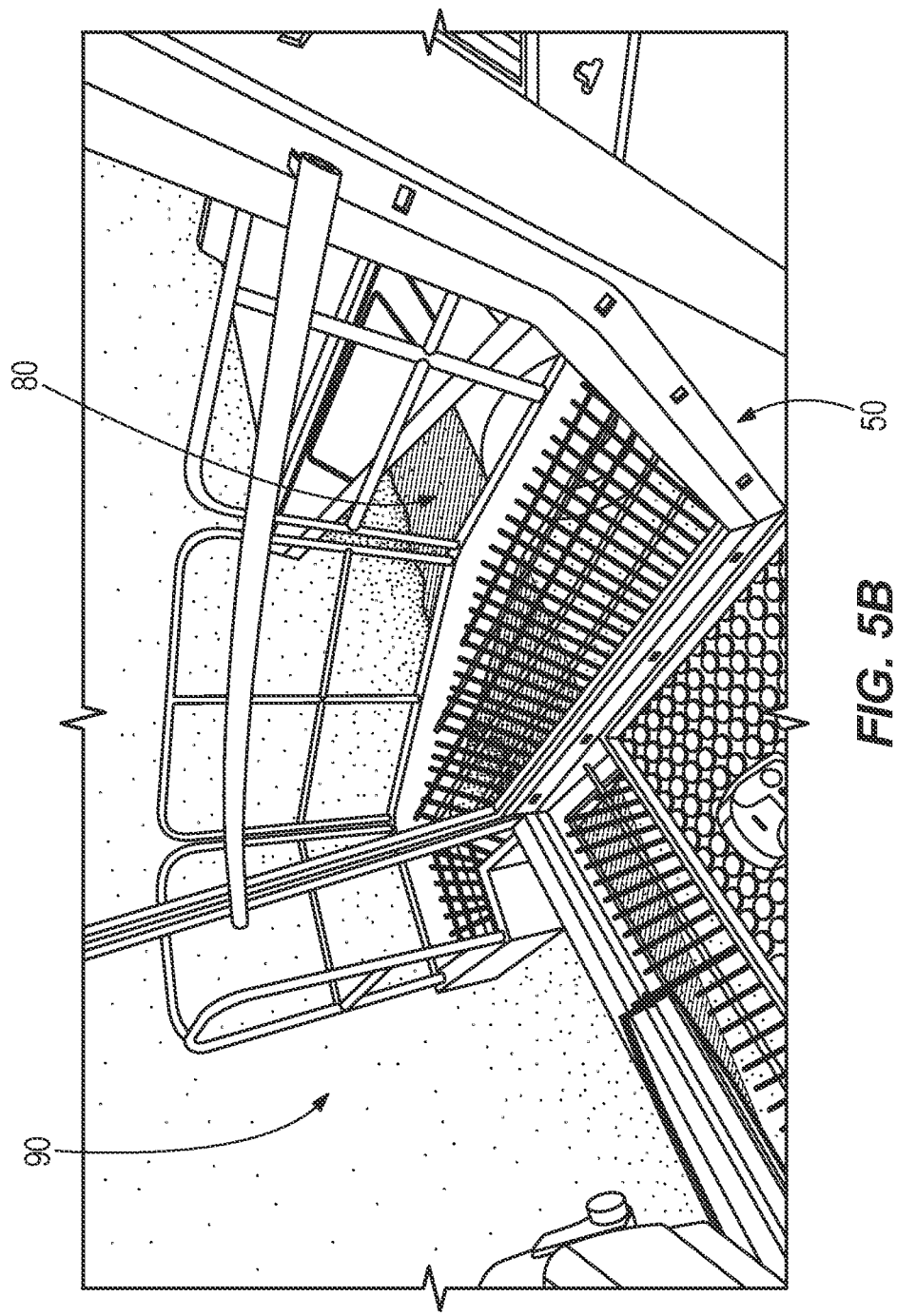
Figure 5C:
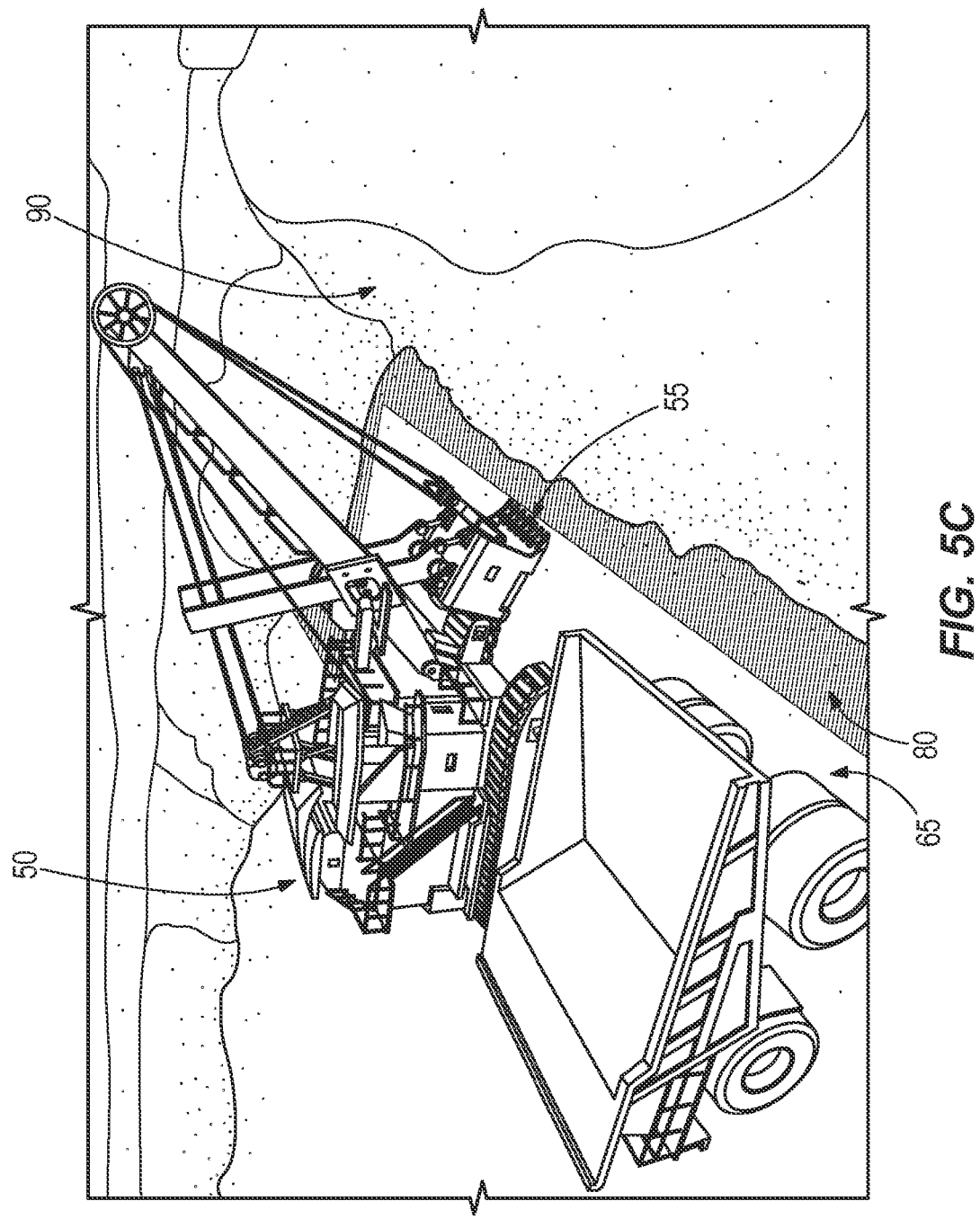

As illustrated in FIGS. 5*a-c*, the level-grade detection function provided by the application 19 displays an indicator 80 within the simulated environment marking at least a portion of the level-grade plane 65. In some embodiments, the application 19 displays the indicator 80 adjacent to a side wall or bank 90 where an operator should dig. The indicator 80 helps operators gain perspective when trying to place teeth of the dipper 55 in the appropriate area of the bank 90. As illustrated in FIGS. 5*a-c*, the indicator 80 can include an area of colored highlighting overlaying or replacing a portion of the ground or surface where the shovel 50 is digging (e.g., in a color different from the color of the ground or surface). In other embodiments, the indicator 80 can include a marker or symbol, an outline or line, or animation (e.g., flashing colors, lines, or shapes) in place of or in addition to the highlighted area.

Figure 6B:
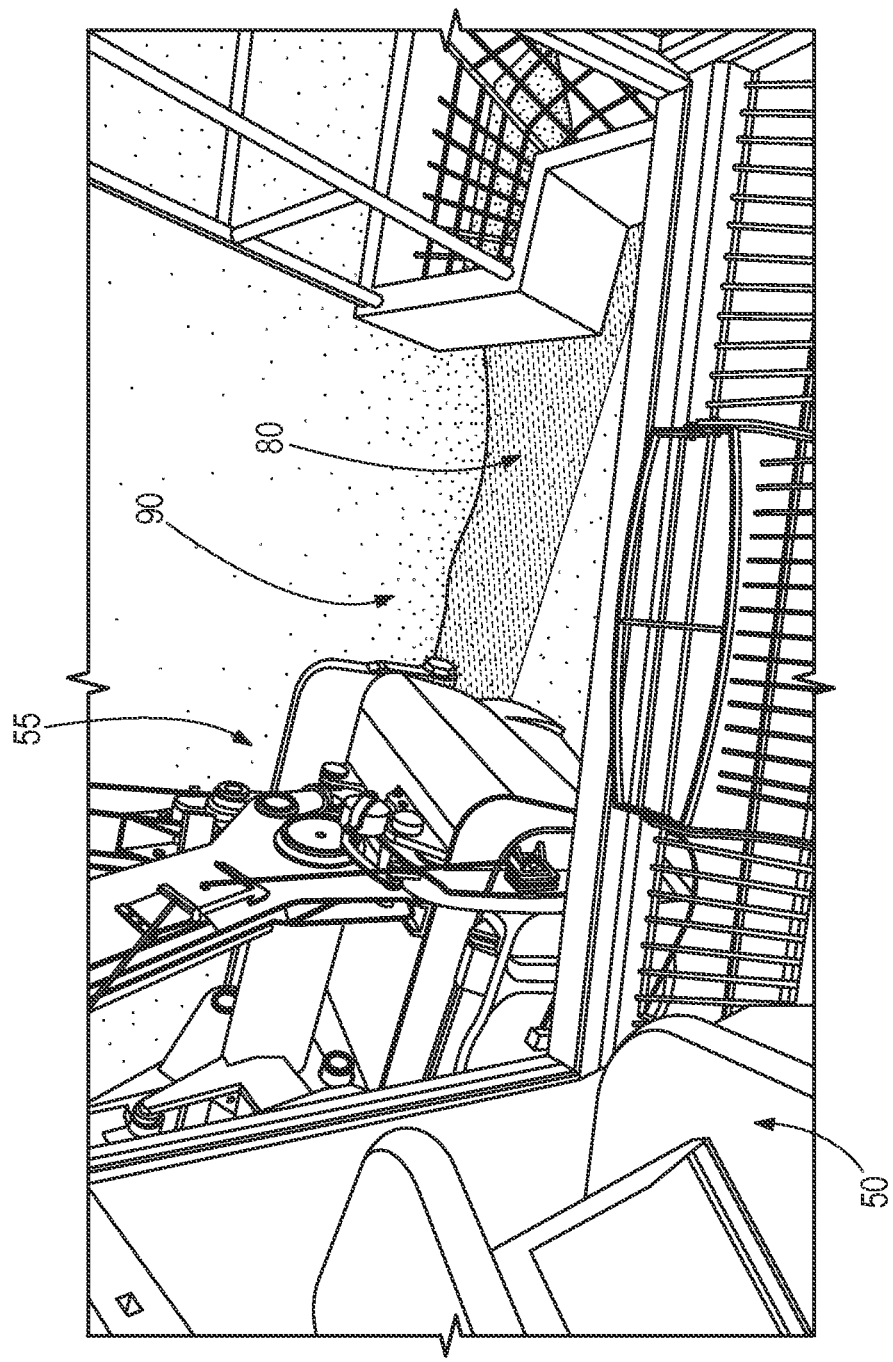

As the operator moves the dipper 55 within the simulated environment (e.g., using one or more input devices 20), the application 19 detects whether a portion of the dipper 55 (e.g., a teeth of the dipper 55) is positioned lower or beneath the level-grade plane 65. If the operator moves a portion of the simulated dipper 55 beneath the level-grade plane 65, the application 19 provides a warning to the operator. In some embodiments, the application 19 changes the indicator 80 (e.g., color, size, shape, pattern, or animation) to provide a warning to the operator. For example, if the dipper 55 is not positioned beneath the level-grade plane 65, the application 19 displays the indicator 80 in a first color (e.g., green) (see FIGS. 5*a-c*). If at least a portion of the dipper 55 is positioned beneath the level-grade plane 65, the application 19 displays the indicator 80 in a second color (e.g., red) (see FIGS. 6*a-b*). Also, in some embodiments, the application 19 gradually fades the indicator 80 from one color to another depending on the position of the dipper 55 relative to the level-grade plane 65. For example, the application 19 can gradually fade the indicator 80 from a first color into a second color such that the color of the indicator 80 approaches the second color the lower the operator positions the dipper 55 beneath the level-grade plane 65. The application 19 can also use multiple colors to inform the operator of how far the dipper 55 is positioned above, at, or beneath the level-grade plane. Therefore, one of the operator's goals can be to keep the indicator 80 as close to a particular color as possible by placing the dipper's teeth at the seam of the level-ground plane 65 and the bank 90.

Alternatively or in addition, the application 19 can be configured to use features of the indicator 80 other than color to alert an operator when the dipper 55 is positioned lower than the plane 65. For example, the application 19 can be configured to change the size, pattern, shape, or animation (e.g., flash or pulse the indicator) of the indicator 80 when the dipper 55 is positioned lower than the plane 65. In addition to or alternatively to using the indicator 80 to provide a warning to the operator, the application 19 can be configured to display a visual warning within the simulated environment (e.g., text-based warnings, additional color highlighting of the dipper 55, shovel 50, and/or environment) and/or generate an audible or tactile warning to alert the operator that the dipper 55 is positioned below grade.

It should be understood that in some embodiments, the application 19 only provides the indicator 80 (or otherwise provides the operator with a warning or other feedback) when the operator positions the simulated dipper 55 beneath the level-grade plane 65. For example, if the dipper 55 is not positioned below-grade, the application 19 may not display the indicator 80.

Figure 7A:
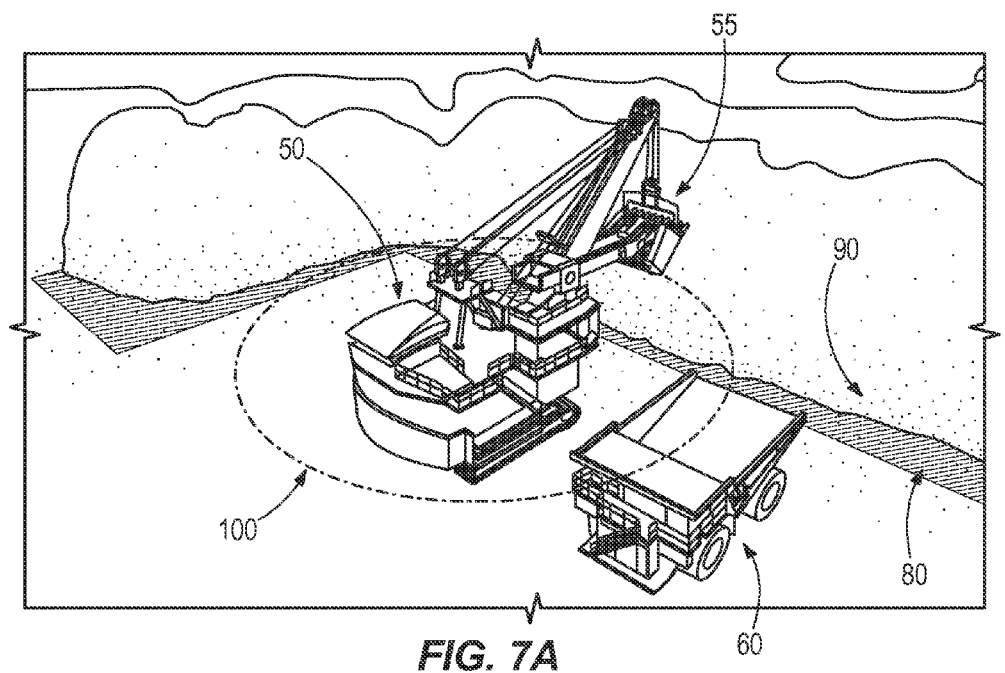
FIGS. 7a-b, 8a-c, and 9a-d are screen shots illustrating a shovel-to-truck alignment function generated by the system of FIG. 1.
Figure 7B:
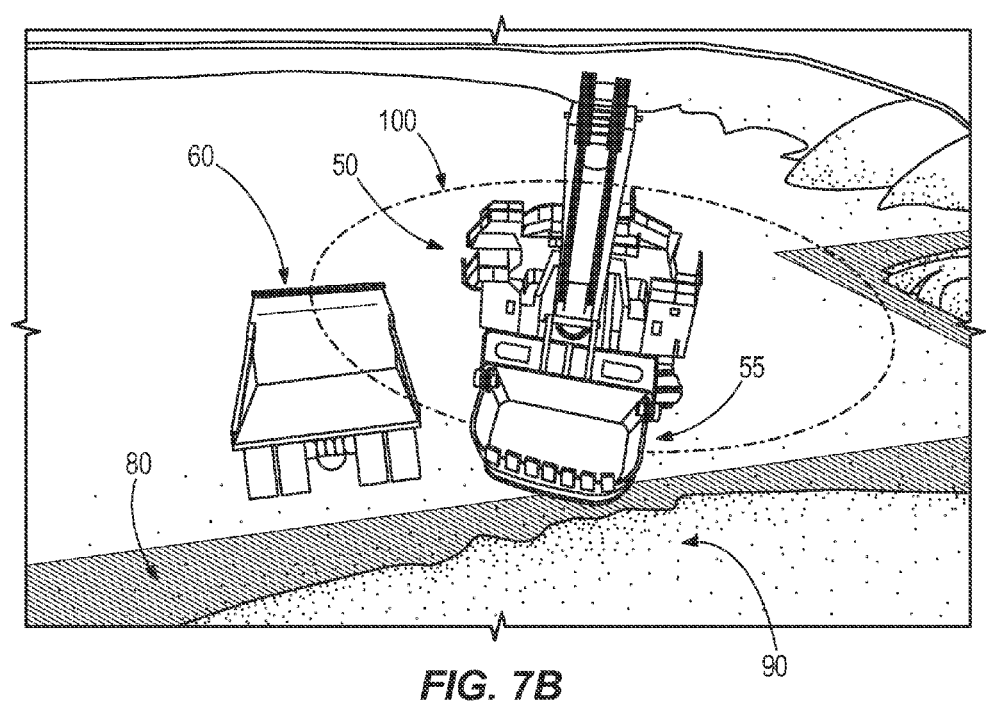

In addition to or alternatively to the level-grade detection function, the application 19 can provide a shovel-alignment depth-related function. This function helps an operator align the dipper 55 with other objects in the simulated working environment or to avoid other objects in the simulated working environment as the dipper 55 swings. For example, an operator can use the shovel alignment function to align the dipper 55 with a simulated haul truck 60 to ensure that materials from the dipper 55 are properly deposited into the truck 60. As illustrated in FIGS. 7a-b, to provide this function, the application 19 displays an indicator 100. The indicator 100 marks at least a portion of a swing path of the dipper 55 (e.g., a path of the center of the dipper 55). If the indicator 100 intersects or overlaps with an object within the simulated working environment, an operator knows that the object will overlap with the dipper 55 in at least one dimension (e.g., depth) if the dipper 55 is swung to that location (e.g., without otherwise moving the shovel 50). As illustrated in FIGS. 7a-b, the indicator 100 can be a circular outline. In still other embodiments, the indicator 100 can include a marker or symbol, a shape or area, or animation (e.g., flashing colors, lines, or shapes) in place of or in addition to the circular outline.

Figure 8A:
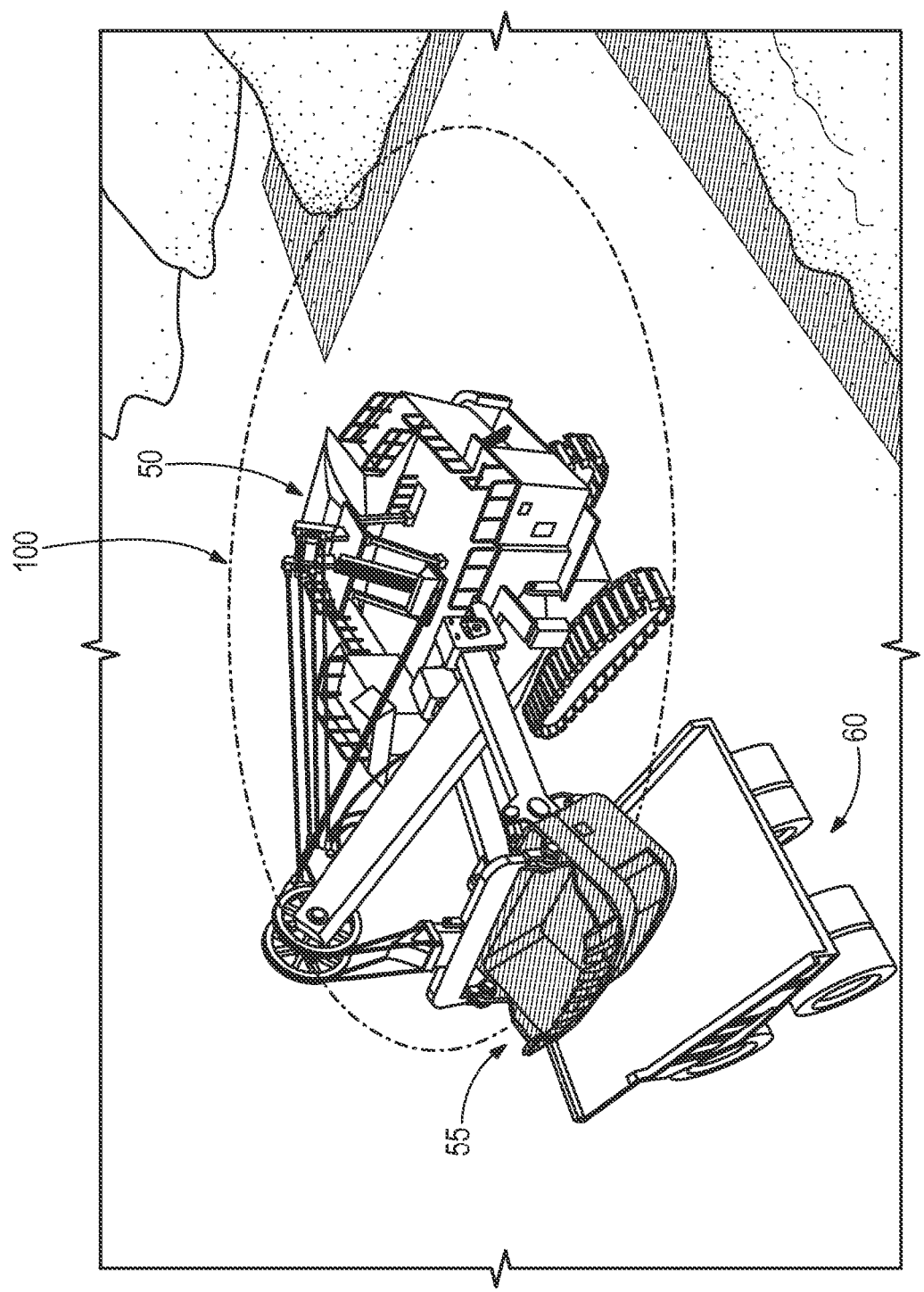
Figure 8B:
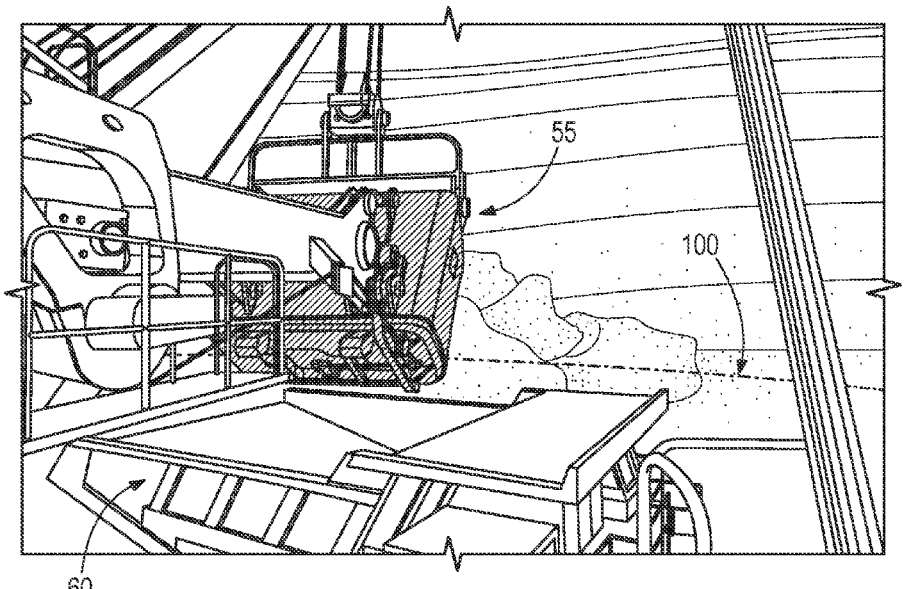
Figure 8C:
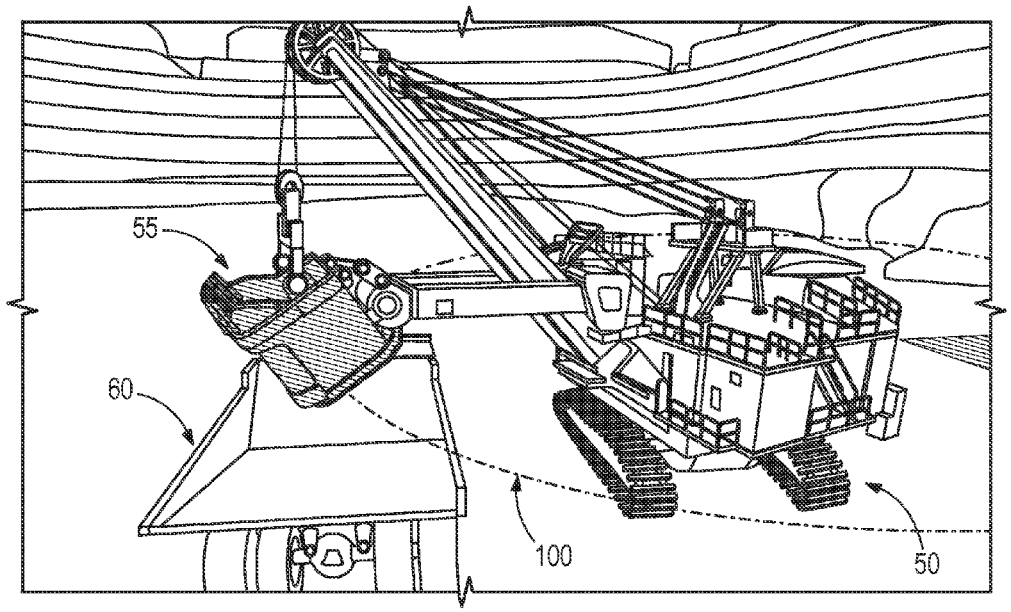

The application 19 can alert the operator when the dipper 55 is aligned with another object in the simulated working environment. For example, the application 19 can modify the indicator 100 (e.g., color, size, shape, pattern, or animation) depending on the position of the dipper 55 with respect to other objects in the simulated working environment. In one embodiment, the application 19 displays the indicator 100 in a first color (e.g., green) when the operator positions the dipper 55 within a predetermined distance from the center of the truck bed of a simulated haul truck 60 (see FIGS. 8a-c). If the dipper 55 is not positioned within the predetermined distance from the center of the truck bed, the application 19 displays the indicator 100 in a second color (e.g., red) (see FIGS. 9a-d).

In some embodiments, the application 19 uses multiple thresholds and multiple colors to convey depth information to the operator using the indicator 100. For example, if the dipper 55 is not within a first predetermined distance from the center of the truck bed (e.g., approximately 50 feet), the application 19 displays the indicator 100 in a first color (e.g., red). When the dipper 55 is positioned within a second predetermined distance from the center of the truck (e.g., approximately 25 feet) but not within a third, shorter predetermined distance from the center of the truck bed (e.g., approximately 2 feet), the application 19 displays the indicator 100 in a second color (e.g., yellow). Finally, when the dipper 55 is positioned within the third predetermined distance from the center of the truck bed, the application 19 displays the indicator 100 in a third color (e.g., green). Similarly, the application 19 may use the color of the indicator 100 to convey to the operator whether the dipper 55 needs to be moved forward or backward to be properly aligned with the center of the truck bed. The application 19 may also display one or more indicators (e.g., arrows or text-based messages) in addition to the indicator 100 to inform the operator whether the dipper 55 needs to be moved forward or backward to be properly aligned with the center of the truck bed.

Figure 9A:
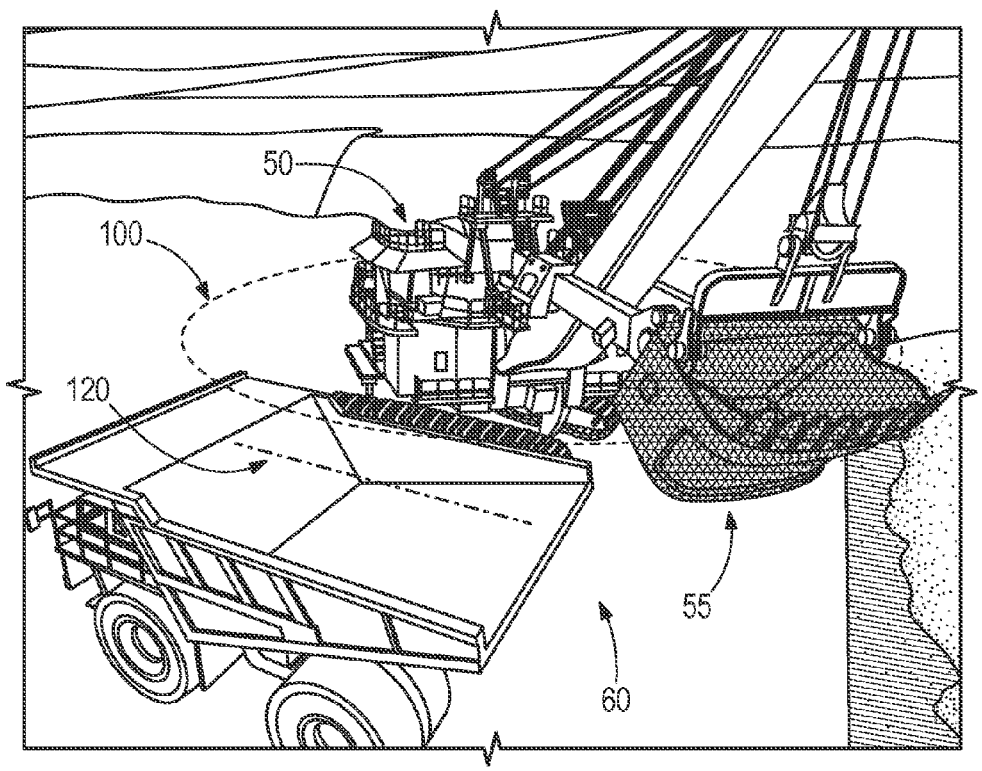
Figure 9B:
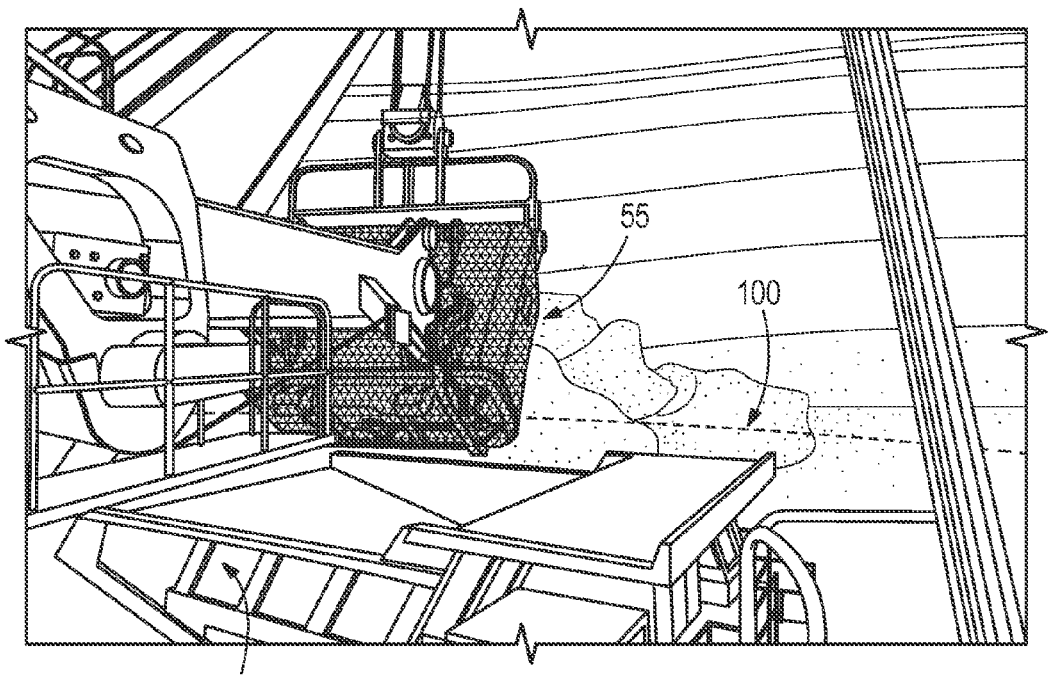
Figure 9C:
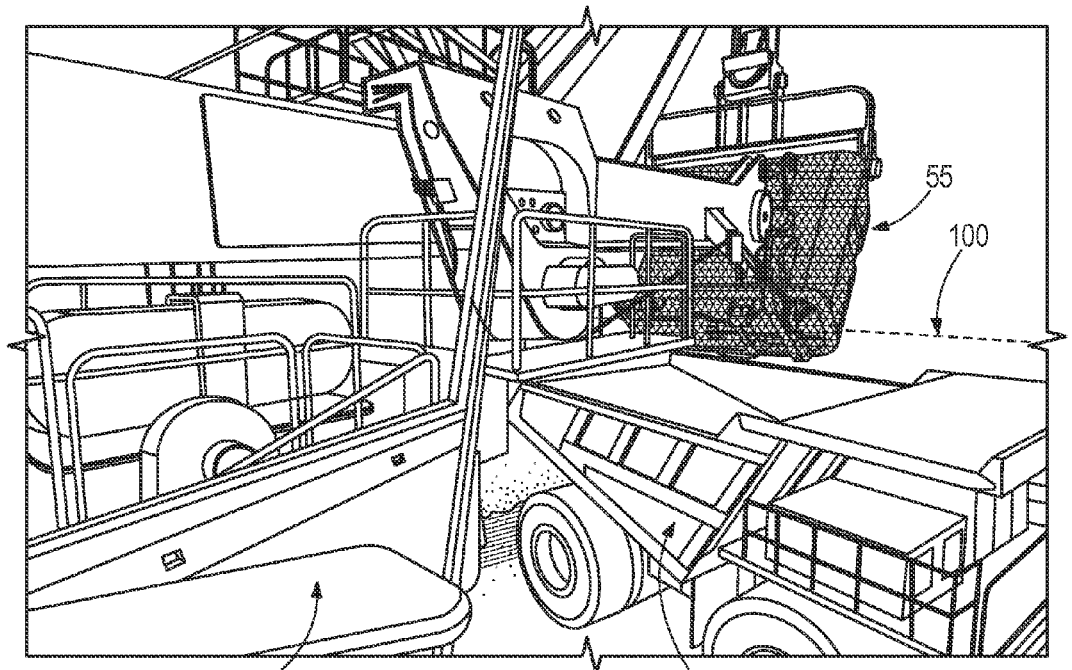
Figure 9D:
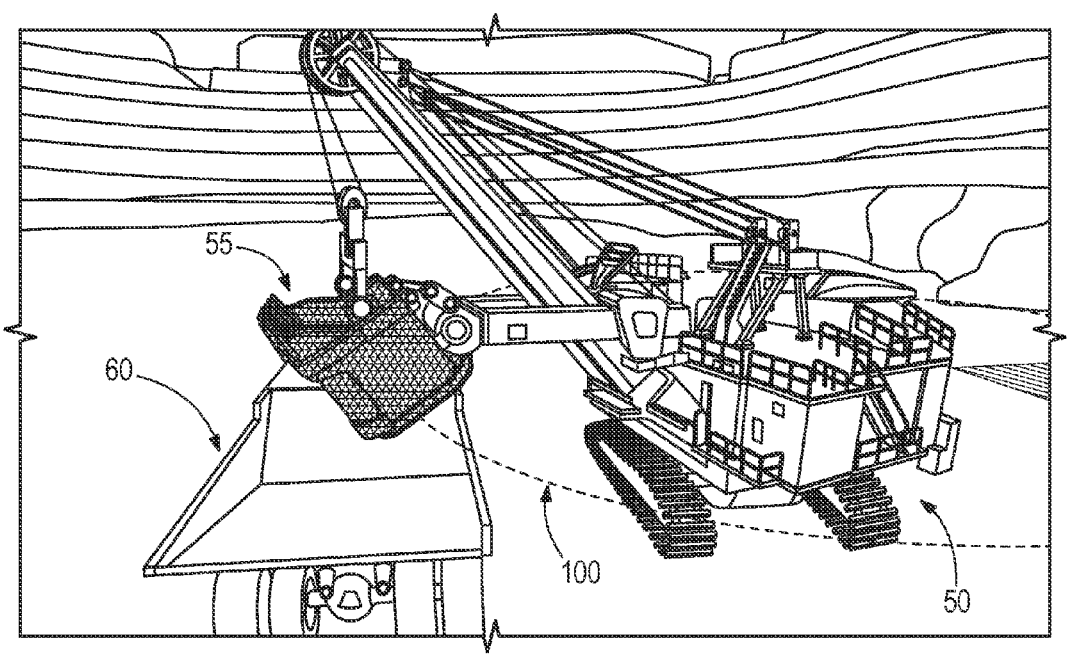
Figure 10A:
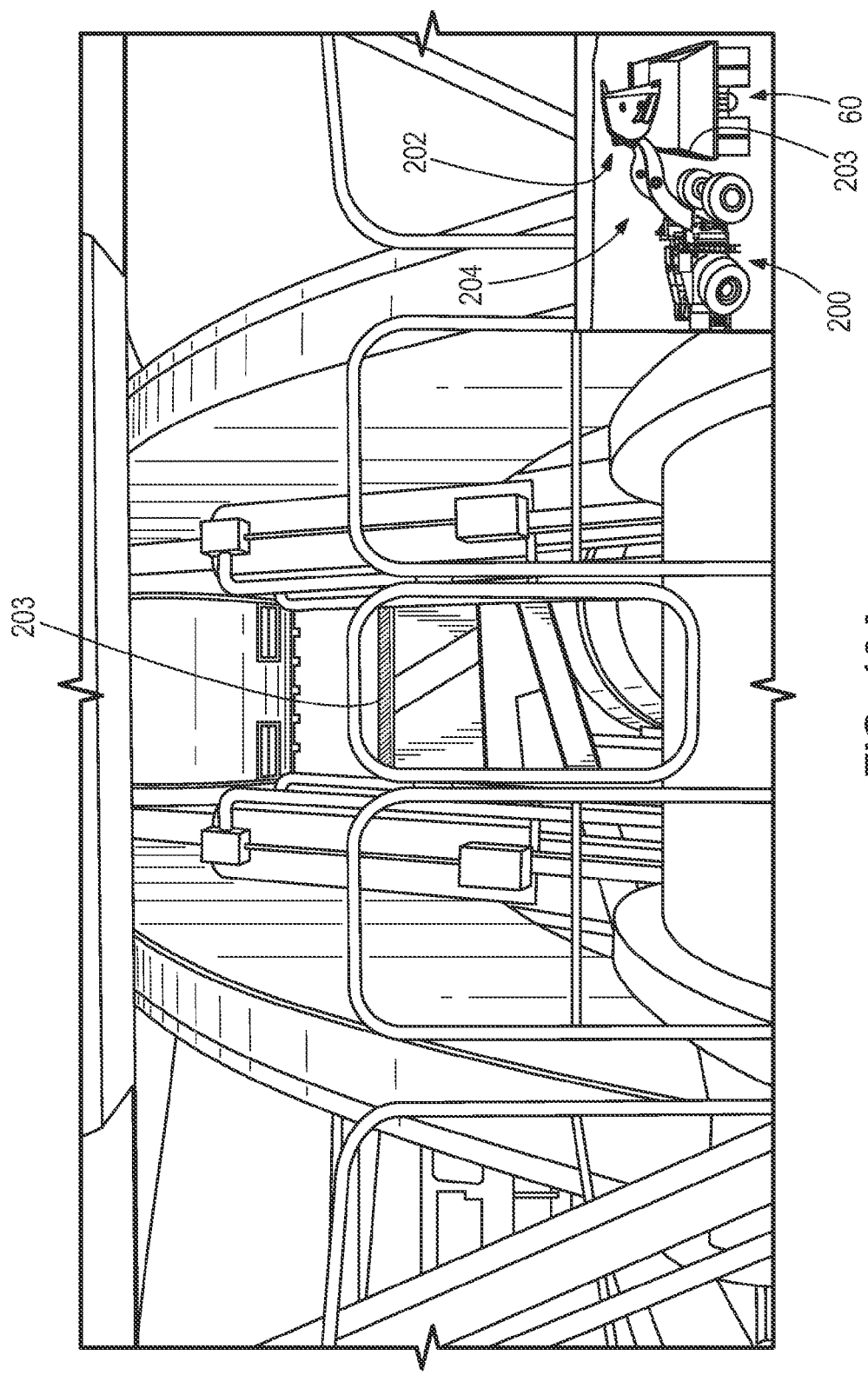
FIGS. 10a-d are screen shots illustrating a bucket-height help function generated by the system of FIG. 1.
Figure 10B:
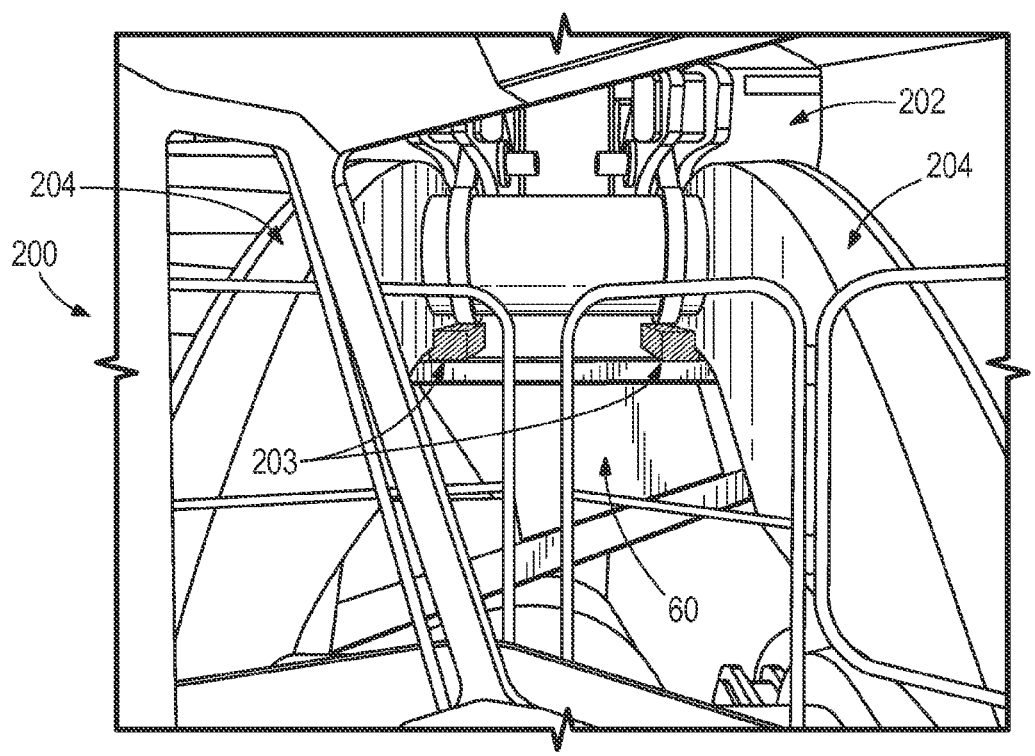
Figure 10C:
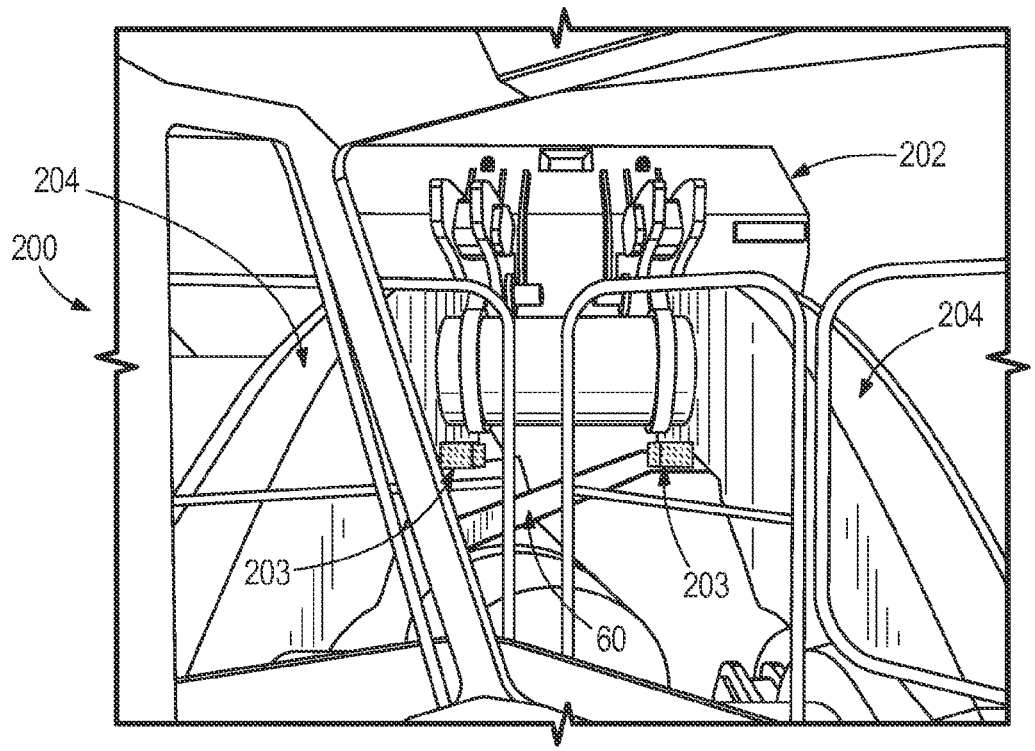
Figure 10D:
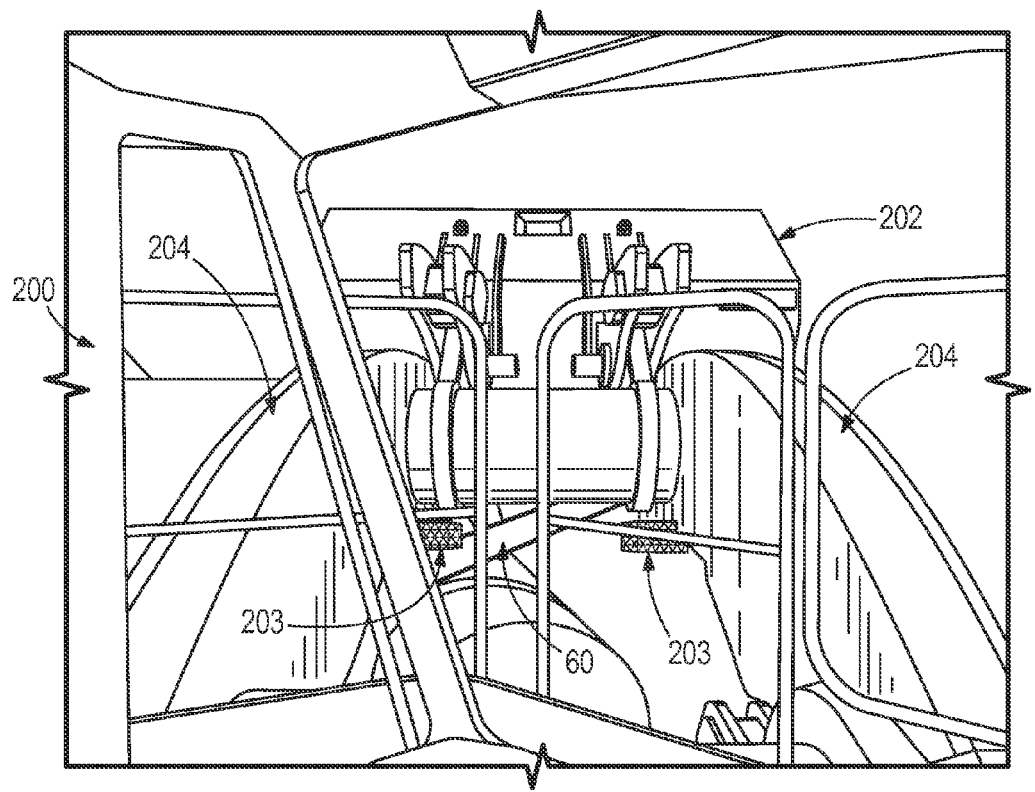

In some embodiments, the application 19 also changes the dipper 55 or other portions of the shovel 50 to further emphasize the current relationship between the dipper 55 and the truck 60. For example, as illustrated in FIGS. 8a-c and 9a-d, the application 19 can change the color of the dipper 55 to match the current color of the indicator 100. Alternatively or in addition, the application 19 can be configured to use features other than a color of the indicator 100 to inform the operator when the dipper 55 is properly and/or improperly positioned to load a truck 60 (e.g., using flashing or other animation, text-based messages, audible feedback, tactile feedback, etc). Also, as illustrated in FIG. 9a, in some embodiments, the application 19 displays a centerline 120 on the truck 60, which the operator can align with the indicator 100 to position the dipper 55 over a center of the truck 60. The application 19 can also change the color or other features of the centerline 120 based on whether or not the dipper 55 is positioned within a predetermined distance from the centerline 120.

In some embodiments, the computing device 10 (e.g., the application 19) can be configured to provide training for wheel loaders. In particular, the application 19 can generate a simulated training environment including a simulated wheel loader 200 having a simulated bucket 202. As part of this training, the application 19 can be configured to provide one or more help functions (e.g., depth-related help functions). The help functions provide various indicators (e.g., visual, audible, tactile, etc.) within the simulated training environment to aid the operator in judging depth and operating the wheel loader 200 accordingly. For example, the application 19 can provide a bucket-height help function. As illustrated in FIGS. 10a-d, the application 19 can display a height line 203. In some embodiments, the height line 203 is superimposed on the top of a side of a simulated haul truck 60 (e.g., the side closest the wheel loader 200) (see, e.g., FIG. 10a) or on the underside of lift arms 204 supporting the bucket 202 (see, e.g., FIGS. 10b-d). The application 19 can change the color or other features (e.g., animation, brightness, size, shape, etc.) of the height line 203 based on whether the bucket 202 (e.g., the parallel lift arms 204) are at or above the height of a simulated haul truck 60. For example, when the lift arms 204 are not above the height, the application 19 displays the height line 203 in a first color (e.g., red, see FIG. 10d) and changes the line 203 to a second color (e.g., green, see FIGS. 10a-b) when the lift arms 204 are at or above the height. Also, in some embodiments, when the lift arms 204 are close to the appropriate height, the line 203 changes to a third color (e.g., orange, see FIG. 10c). Ensuring the lift arms 204 are at least at the height of the truck 60 helps ensure that material included in the bucket 202 is properly deposited into the truck 60.

Figure 11A:
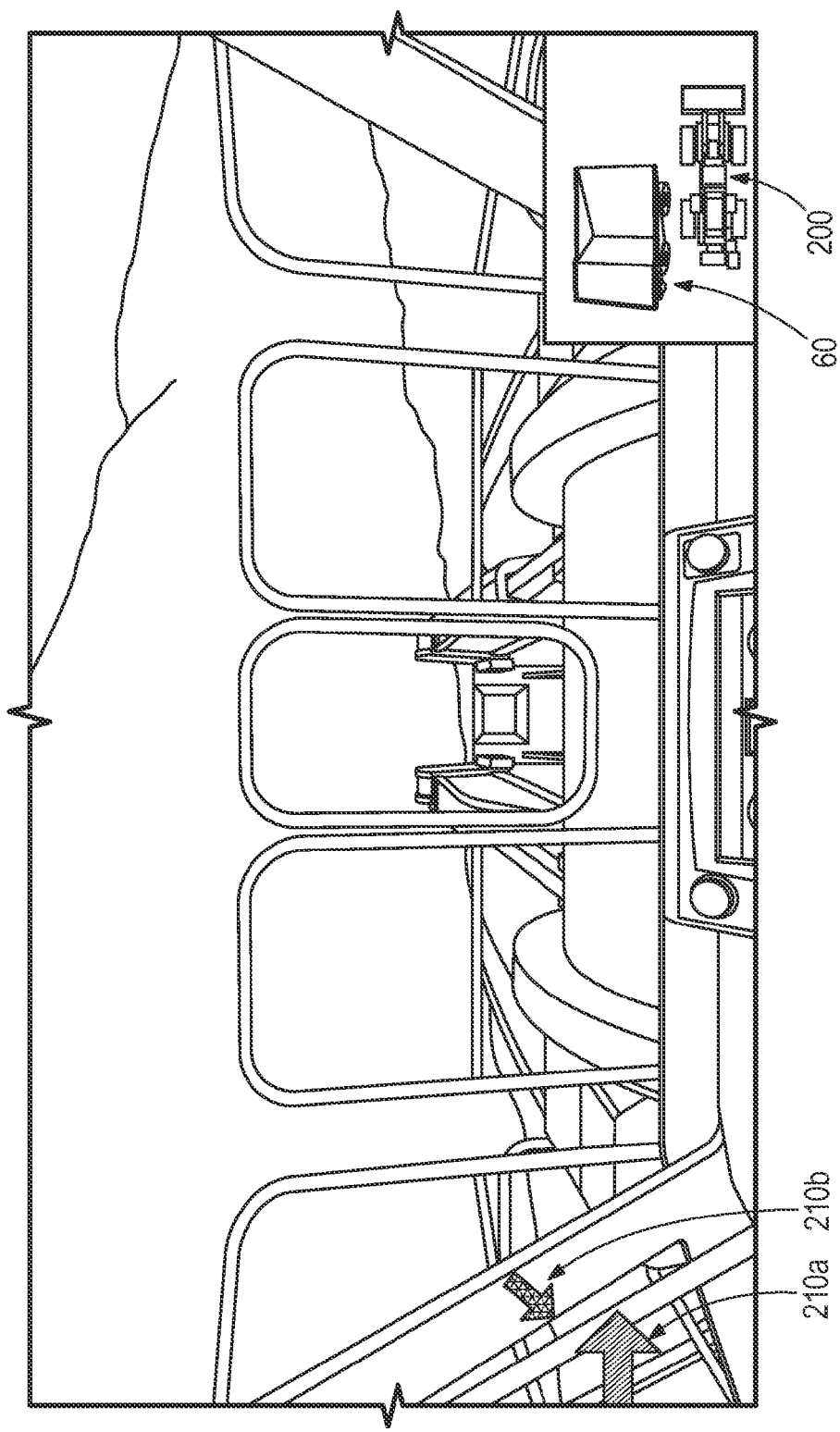
FIGS. 11a-c are screen shots illustrating a loader-turn help function generated by the system of FIG. 1.
Figure 11B:
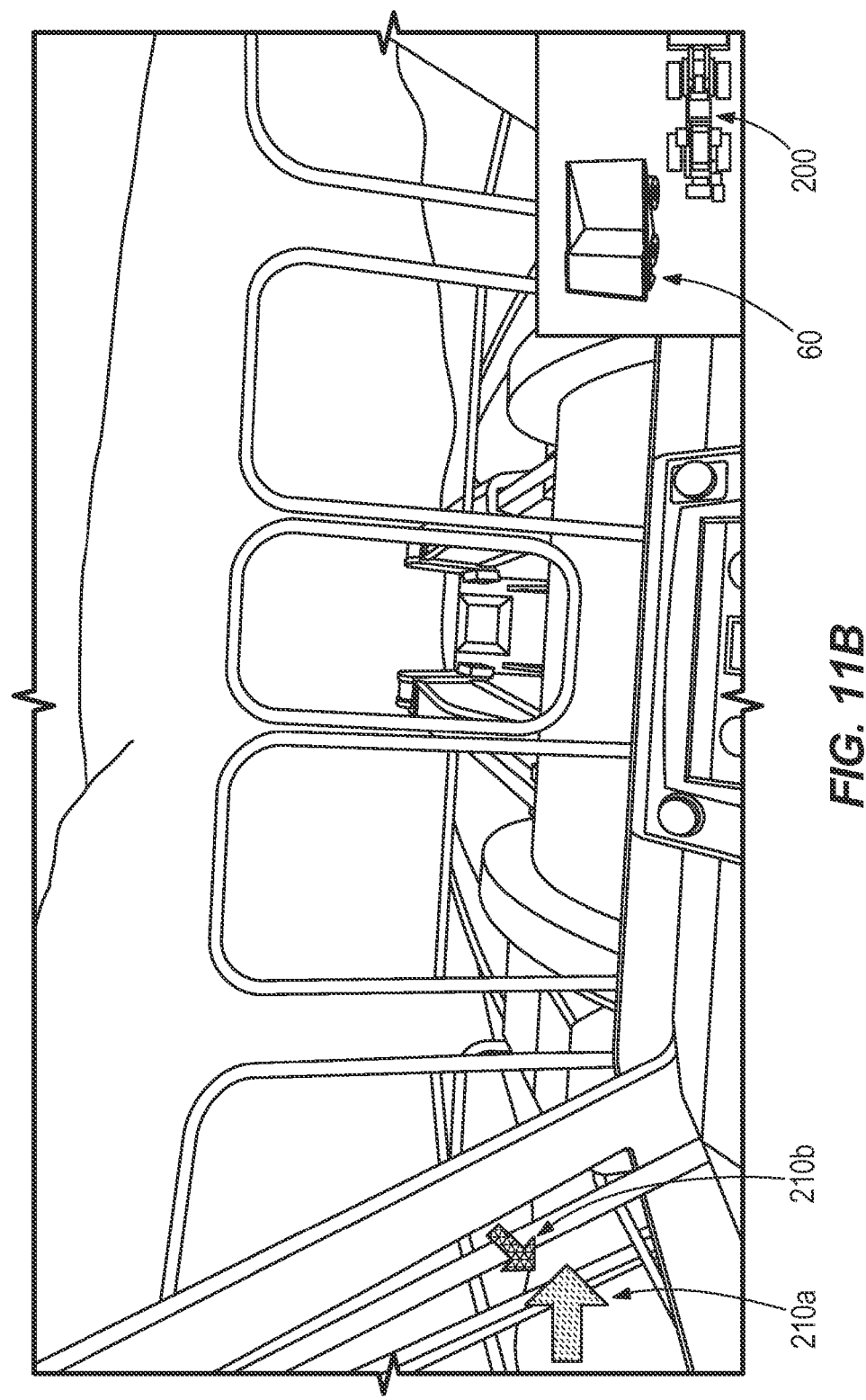
Figure 11C:
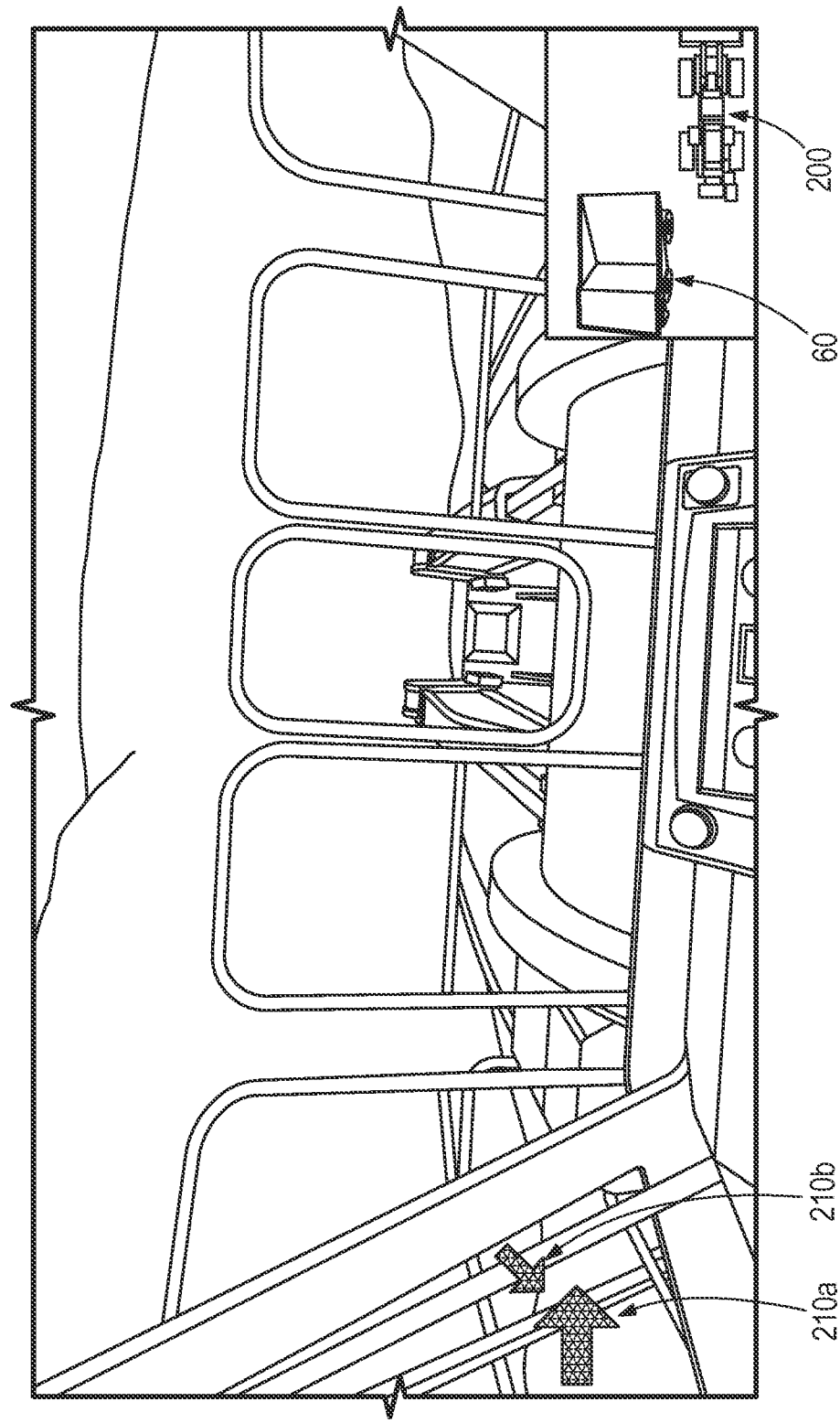

The application 19 can also provide a loader-turn help function. After a wheel loader scoops materials with the bucket, the wheel loader backups and turns to face the haul truck. There is an optimal path for performing this backup-and-turn maneuver (e.g., to ensure that the wheel loader (e.g., the bucket) does not impact the ground, the bank, the truck, etc.). Therefore, in some embodiments, the loader-turn help function helps an operator learn how far to back-up and/or when to turn to face the haul truck after digging. In some embodiments, to provide the loader-turn help function, the application 19 generates one or more direction markers 210 that appear and/or change (e.g., color, animation, brightness, size, shape, etc.) to inform an operator of the simulated wheel loader 202 when to move the loader 200 in a particular direction (e.g., informing the operator to back-up the loader 200 until the loader 200 is positioned at least halfway down the length of the truck 60). For example, as illustrated in FIGS. 11a and c, the application 19 can generate a first direction marker 210a and a second marker 210b. Each marker 210a and 210b can be a first color (e.g., red) when the operator should not move the loader 200 in the direction indicated by the marker 210 and a second color (e.g., green) when the operator should move the loader 200 in the direction indicated by the marker 210. Also, in some embodiments, as illustrated in FIG. 11b, a direction marker 210 can change to a third color (e.g., yellow or orange) to indicate when the wheel loader 200 is close to the optimal position (i.e., informing the operator that he or she should slow movement of the wheel loader 200 to prepare to stop the wheel loader 200). Using a third color to inform an operator when a position is close to a desired or approved position can allow the operator to adjust the speed of operation of the wheel loader 200 to ensure that the desired position is obtained.

In some embodiments, the application 19 also provides an approach help function. For example, when the wheel loader approaches the haul truck, it may be desirable that a spill guard weld on the bucket 202 is no higher than the height of the haul truck side rail (see FIG. 10, the marker 203 is superimposed over at least a portion of the haul truck side rail). For example, suspending a load contained in the bucket 202 too high while approaching the haul truck can cause the wheel loader 200 to tip over. Therefore, as part of this help function, the application 19 can provide a marker that appears and/or changes (e.g., color, animation, brightness, size, shape, etc.) to inform an operator of the simulated wheel loader 200 when the weld is above the height of the haul truck side rail. For example, in some embodiments, the marker is superimposed on the weld and/or the side rail and changes colors based on the height of the weld with respect to the side rail.

Figure 12A:
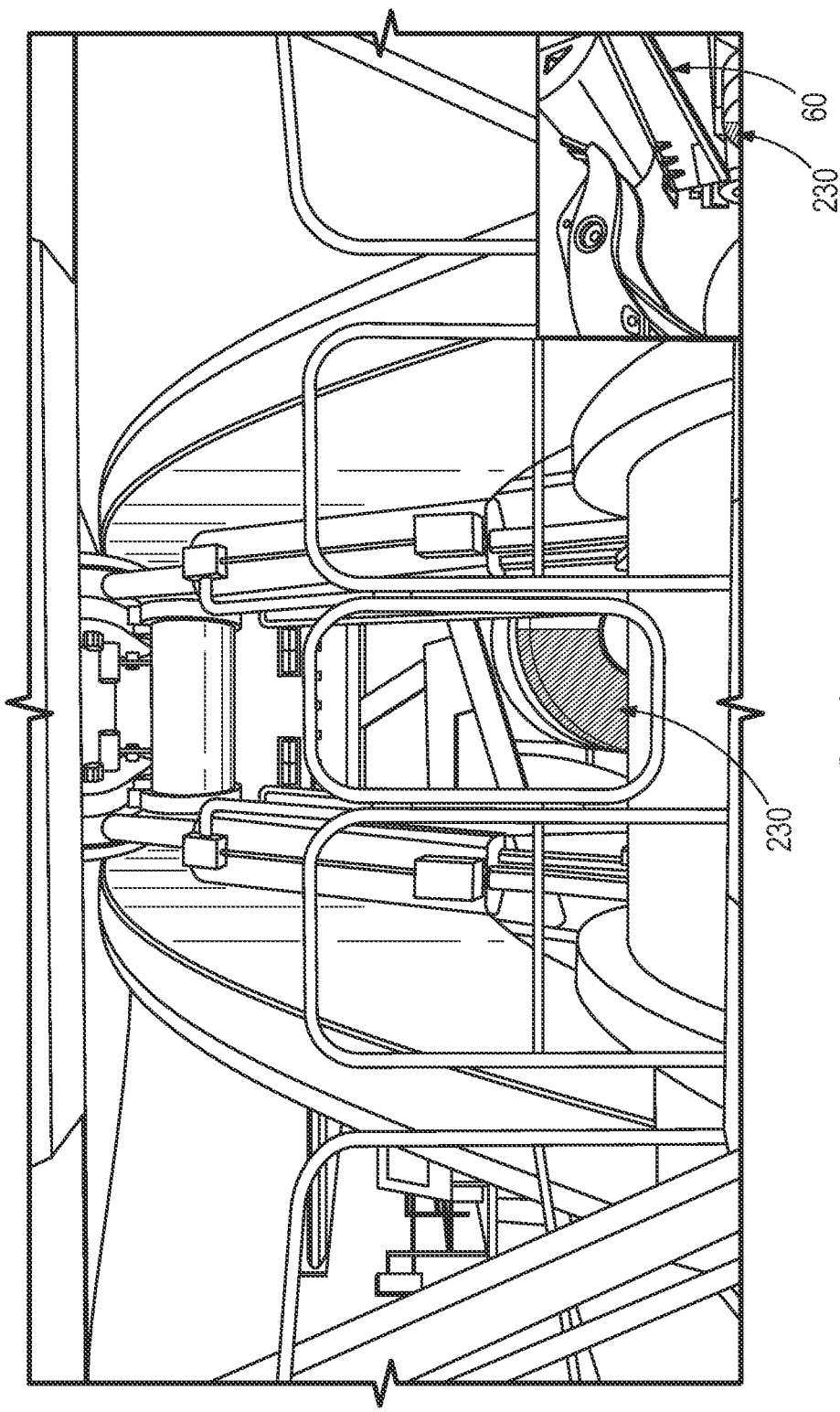
FIGS. 12a-b are screen shots illustrating a loader-to-truck alignment function generated by the system of FIG. 1.
Figure 12B:
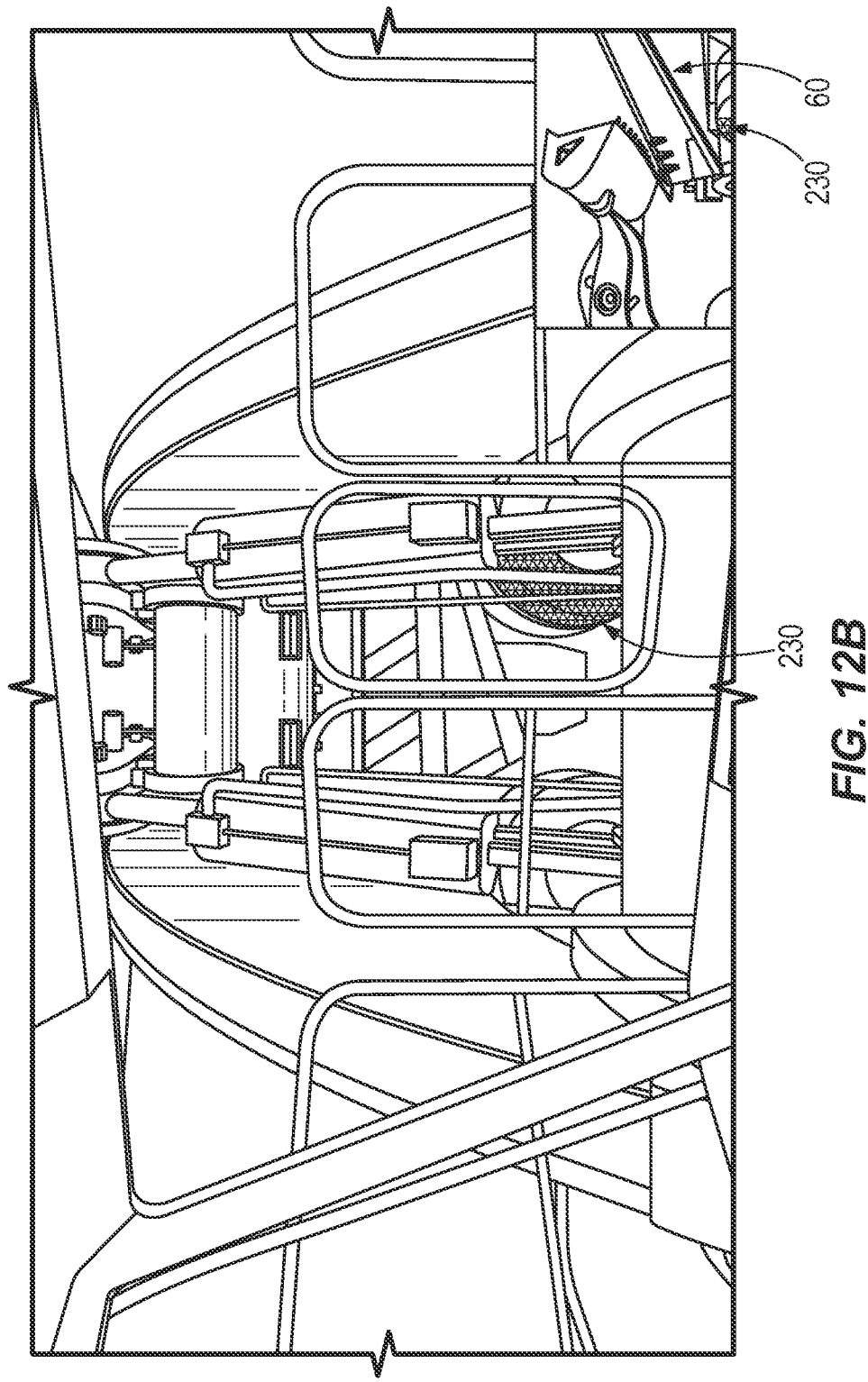

The application 19 can also be configured to provide a loader-to-truck alignment help function. To provide this help function, the application 19 generates a position marker 230. The position marker 230 helps the operator align the wheel loader 200 with the truck 60 to ensure the operator dumps the contents of the bucket 202 into the proper position within the truck 60. In some embodiments, the application 19 changes the marker 230 (e.g., color, animation, brightness, size, shape, etc.) to inform the operator whether the wheel loader 200 is properly or improperly aligned with the truck 60 for performing a dump. For example, in some embodiments, an operator should dump the contents of the bucket in a particular position of the haul truck to ensure efficient use of the haul truck and stability of the contents contained in the haul truck. Aligning the center of the wheel loader with the front half of the back tire of the haul truck positions the wheel loader can be considered an optimal position for dumping contents into the haul truck. Therefore, in some embodiments, as illustrated in FIG. 12a-b, the position marker 230 highlights the front half of the back tire of the haul truck 60. The application 19 can change the position marker 230 from a first color (e.g., red, see FIG. 12b) to a second color (e.g., green, see FIG. 12a) when the wheel loader is optimally positioned for dumping. In some embodiments, the application 19 also generates a graphical line that marks the center of the wheel loader 200. Therefore, an operator can align the graphical line with the position marker 230 to learn how to properly align the wheel loader with the truck for dumping.

Figure 13A:
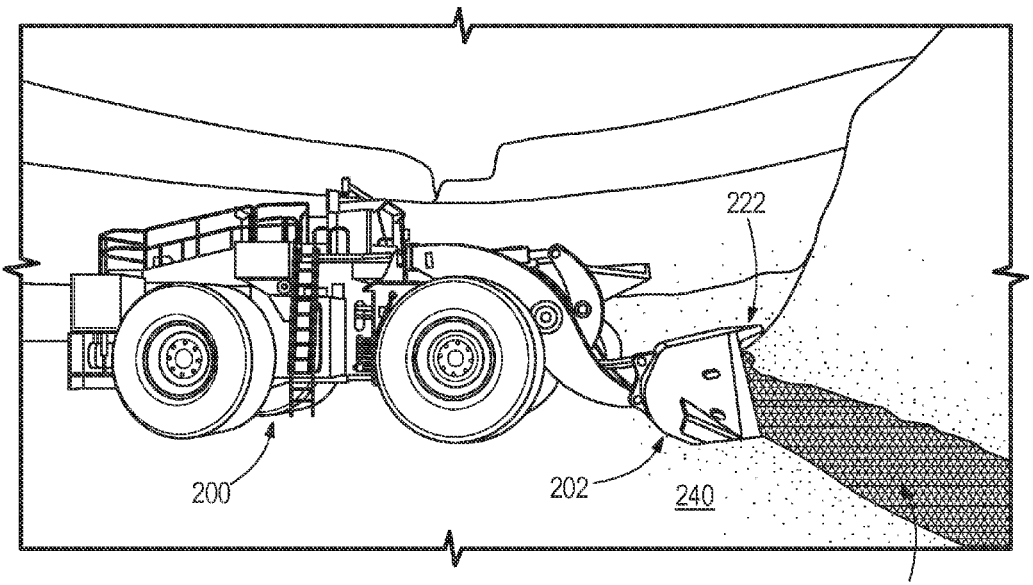
FIGS. 13a-b are screen shots illustrating a level-grade help function generated by the system of FIG. 1.
Figure 13B:
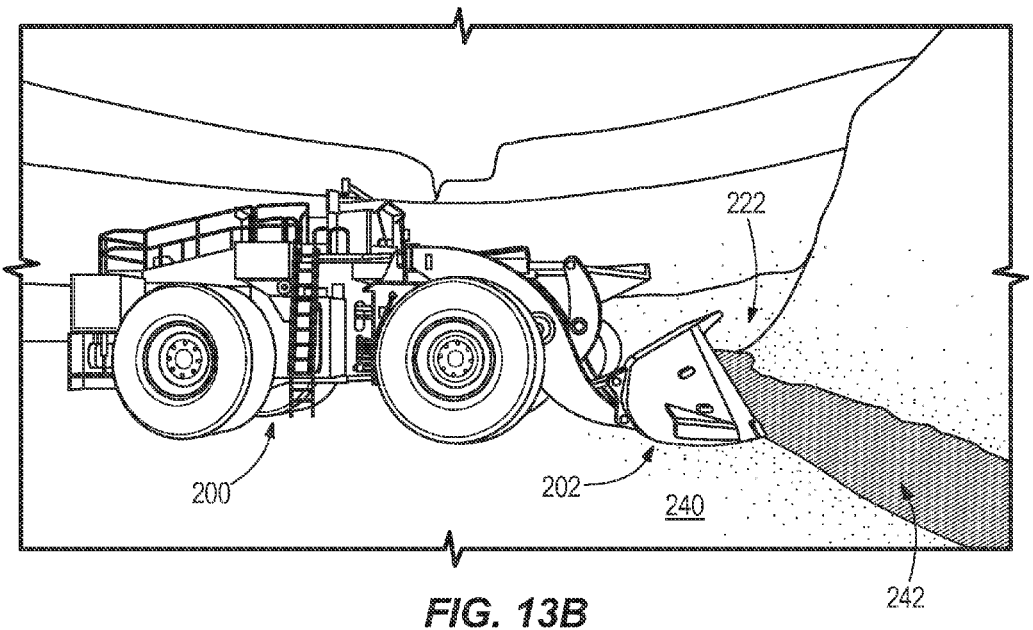

Similar to the level-grade detection function described above, the application 19 can also provide a level-grade help function for a simulated wheel loader 200 that detects when an operator is digging with the simulated bucket 202 beneath a level-grade plane 240 (e.g., the ground the wheel loader 200 sits on) within the simulated training environment. In a real-world situation, if an operator digs lower than the level-grade plane, a ditch is formed in the ground supporting the wheel loader and the wheel loader can sink into the ditch. As illustrated in FIG. 14, the application 19 can display an indicator 242 within the simulated environment that marks at least a portion of the level-grade plane 240. In some embodiments, the application 19 displays the indicator 242 adjacent to a side wall or bank where an operator should dig. The indicator 240 helps an operator gain perspective when trying to place teeth of the bucket 202 in the appropriate area of the bank. As illustrated in FIGS. 13a-b, the indicator 242 can include an area of colored highlighting overlaying or replacing a portion of the ground or surface where the wheel loader 200 is digging (e.g., in a color different from the color of the ground or surface). The indicator 242 can change color based on whether the operator is digging or positioning the bucket 202 for digging beneath the level-grade plane 240. In other embodiments, the indicator 242 can include a marker or symbol, an outline or line, or animation (e.g., flashing colors, lines, or shapes) in place of or in addition to the highlighted area.

Figure 14A:
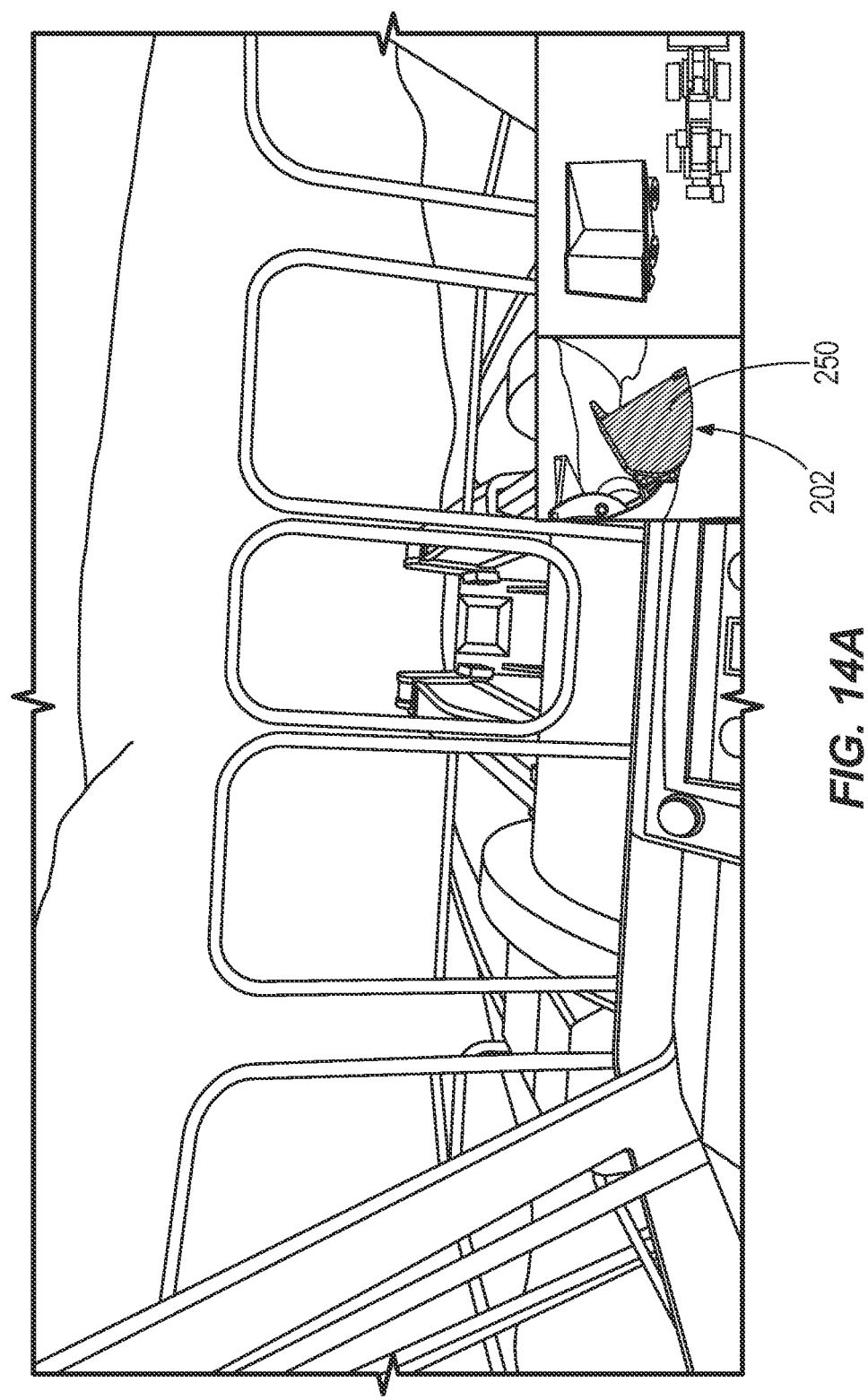
FIGS. 14a-b are screen shots illustrating a bucket-angle help function generated by the system of FIG. 1.
Figure 14B:
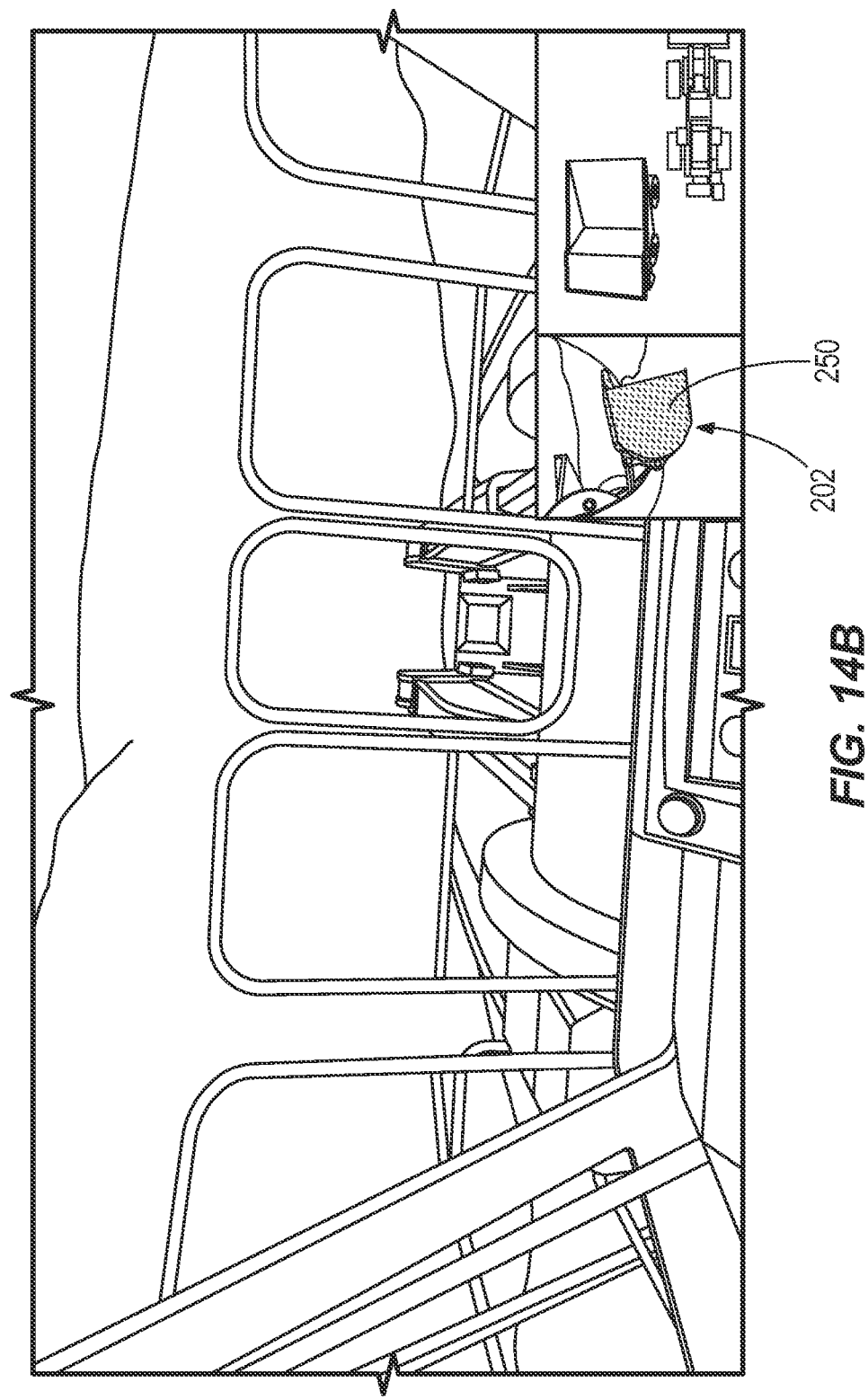

In some embodiments, the application 19 also provides a bucket-angle help function. The bucket-angle help function helps an operator properly angle the bucket 202 while digging or scoping. For example, as illustrated in FIGS. 14a-b, the application 19 can overlay an indicator 250 on the bucket 202 that changes color based on whether the bucket is properly angled. In other embodiments, the application 19 is configured to generate an indicator that includes a graphical coordinate axis (e.g., on each side of the bucket 202) that indicates a current angle that the bucket 202 is positioned at. In still other embodiments, the indicator can include an angled line, and the operator can attempt to angle the bucket 202 at the same angle as the angled line. In yet other embodiments, indicator can include an arrow that instructs the operator what direction to angle the bucket 202 toward. The application 19 can stop displaying the arrow when the bucket 202 is positioned at the appropriate angle. In all of the above embodiments, the application 19 can also change features of the indicator (e.g., color, animation, brightness, size, shape, etc.) based on whether the bucket 202 is angled at a proper or improper angle for digging or scoping.

Therefore, embodiments of the invention provide depth-related help functions within a simulated training environment for shovels, wheel loaders, and other industrial machinery. In particular, embodiments of the invention provide systems and methods for generating a simulated training environment including a simulated shovel having a simulated dipper or a simulated wheel loader having a simulated bucket, and displaying at least one indicator in the simulated training providing depth information to an operator relating to the position of the simulated dipper or the simulated bucket with respect to a point-of-reference within the simulated training environment. As described above, the point-of-reference can include a particular horizontal or vertical plane or a particular position of a truck bed on a simulated haul truck. However, it should be understood that the point of reference can include any position or object within the simulated environment that the operator must align the simulated machine with, such as a digging depth, a shutdown or maintenance height of the dipper, a stopping position of the shovel or wheel loader, etc. In some embodiments, the point-of-reference can also be selected or set by an operator. The systems and methods can also alert or warn the operator when the operator is operating the industrial machinery properly or improperly. Furthermore, it should be understood that the depth-related help functions described in the present application can be used in simulated training environments for other types of industrial equipment to provide depth information to an operator for a particular point-of-reference. Therefore, embodiments of the present invention are not limited to simulated training environments for shovels and wheel loaders.

Various features of the invention are set forth in the following claims.

What is claimed is:

1. A system for training an operator, the system comprising:
    a computing device including a processing unit and computer-readable medium, the computer-readable medium storing a training simulator application;
    wherein the training simulator application, when executed by the processing unit, is configured to
        receive an operating command from the operator,
        generate and output a simulated training environment, the simulated training environment including a simulated ground plane and a simulated wheel loader having a simulated bucket, the simulated wheel loader and the simulated bucket positioned and moveable within the simulated training environment in response to the operating command received from the operator,
        determine a current position of a level-grade plane within the simulated ground plane,
        determine a current position of at least a portion of the simulated wheel loader within the simulated training environment,
        determine if at least a portion of the simulated bucket is below the level-grade plane based on the current position of at least a portion of the simulated wheel loader and the current position of the level-grade plane,
        when at least a portion of the simulated bucket is below the level-grade plane, generate and output an indicator having a first feature, wherein the indicator marks at least a portion of the level-grade plane within the ground plane, and
        when at least a portion of the simulated bucket is not below the level-grade plane, generate and output the indicator having a second feature, wherein the second feature differs from the first feature by at least one selected from the group comprising a color, a size, a shape, a pattern, and an animation.

2. The system of claim 1, wherein the training simulator application is further configured to generate and output a second indicator marking a height of a simulated haul truck within the simulator training environment.

3. The system of claim 1, wherein the training simulator application is further configured to generate and output a second indicator marking a position of a simulated haul truck within the simulated training environment.

4. The system of claim 1, wherein the training simulator application is further configured to generate and output a second indicator marking a centerline of a tire of a simulated haul truck within the simulated training environment.

5. The system of claim 1, wherein the training simulator application is further configured to generate and output a second indicator marking a height of a side rail of a simulated haul truck within the simulated training environment.

6. The system of claim 1, wherein the training simulator application is further configured to generate and output a second indicator marking a height of a guard weld of the simulated bucket.

7. The system of claim 1, wherein the training simulator application is further configured to generate and output a second indicator marking a recommended angle of the simulated bucket.

8. A method for training an operator of a wheel loader, the method comprising:
    generating, with a processor, a simulated wheel loader having a simulated bucket within a simulated training environment;
    generating a simulated haul truck within the simulated training environment;
    determining a current position of at least a portion of the simulated haul truck;
    determining a current position of at least a portion of the simulated wheel loader within the simulated training environment;
    determining a recommended position of the simulated wheel loader based on the current position the simulated haul truck;
    determining if the current position of the simulated wheel loader corresponds to the recommended position;
    when the current position of the simulated wheel loader corresponds to the recommended position, generating and outputting an indicator having a first feature within the simulated training environment, the indicator marking at least a portion; and
    when the current position of the simulated wheel loader does not correspond to the recommended position, generating and outputting the indicator having a second feature, wherein the second feature differs from the first feature.

9. The method of claim 8, wherein generating and outputting the indicator includes generating and outputting the indicator marking a height of the simulated haul truck.

10. The method of claim 8, wherein generating and outputting the indicator includes generating and outputting the indicator marking at least one selected from a group comprising a top side of the simulated haul truck and an underside of simulated lift arms supporting the simulated bucket.

11. The method of claim 8, further comprising displaying a second indicator within the simulated training environment marking a direction of travel of the simulated wheel loader to reach the recommended position.

12. The method of claim 11, further comprising generating and outputting a second indicator within the simulated training environment marking a second direction of travel of the simulated wheel loader to reach the recommended position, wherein the first direction of travel represents a backward direction of travel until the simulated wheel loader is positioned approximately halfway down a length of the simulated haul truck and the second direction of travel represents a turning direction of travel until the simulated wheel loader is facing the simulated haul truck for depositing material in the simulated bucket within the simulated haul truck.

13. The method of claim 8, wherein generating and outputting the indicator includes generating and outputting the indicator a height of a side rail of the simulated haul truck with respect to a height of a guard weld of the simulated bucket.

14. The method of claim 8, wherein generating and outputting the indicator includes generating and outputting the indicator marking a position within the simulated haul truck where the simulated wheel loader should deposit materials contained in the simulated bucket.

15. The method of claim 14, wherein generating and outputting the indicator includes generating and outputting the indicator marking a front half of a back tire of the simulated haul truck.

16. The method of claim 15, wherein determining if the current position of the simulated wheel loader corresponds to the recommended position includes determining if a center of the simulated wheel loader is aligned with the front half of the back tire of the simulated haul truck.

17. The method of claim 8, wherein generating and outputting the indicator having the second feature includes generating and outputting the indicator with the second feature, wherein the second feature differs from the first feature based on color.

18. The method of claim 8, further comprising, when the current position of the simulated wheel loader does not correspond to the recommended position, generating and outputting the indicator with a third feature when the current position of the simulated wheel loader is within a predetermined distance of the recommended position.

19. The method of claim 8, wherein generating and outputting the indicator with the second feature includes generating and outputting the indicator with the second feature, wherein the second feature differs from the first feature based on at least selected from a group consisting of color, size, shape, pattern, and animation.

20. The method of claim 8, further comprising, when the current position of the simulated wheel loader does not correspond to the recommended position, outputting at least one selected from a group consisting of a text-based warning, an audible warning, and a tactile warning.

21. A method for training an operator of a wheel loader, the method comprising:
generating and outputting, with a processor, a simulated wheel loader having a simulated bucket within a simulated training environment;
generating and outputting, with the processor, a simulated ground plane within the simulated training environment;
when an operator operates the simulated wheel loader to load material into the simulated bucket,
determining, with the processor, a current position of a level-grade plane within the simulated ground plane,
determining, with the processor, a current position of at least a portion of the simulated wheel loader within the simulated training environment,
determining, with the processor, if at least a portion of the simulated bucket is below the level-grade plane based on the current position of at least a portion of the simulated wheel loader and the current position of the level-grade plane,
when at least a portion of the simulated wheel loader is below the level-grade plane, generating and outputting, with the processor, an indicator having a first feature, wherein the indicator marks at least a portion of the level-grade plane within the ground plane, and
when at least a portion of the simulated wheel loader is not below the level-grade plane, generating and outputting, with the processor, the indicator having a second attribute, wherein the second attribute differs from the first attribute based on at least one selected from the group comprising color, size, shape, pattern, and animation,
generating and displaying, with the processor, a second indicator within the simulated training environment marking a recommended angle of the simulated bucket;
determining if the simulated bucket is positioned at the recommended angle; and
when the simulated bucket is not positioned at the recommended angle, alerting the operator, wherein alerting the operator includes modifying the second indicator.

22. The method of claim 21, wherein generating and displaying the second indicator includes generating and displaying the second indicator superimposed on the simulated bucket.

23. The method of claim 21, wherein generating and displaying the second indicator includes generating and displaying an angled line within the simulated training environment.

24. The method of claim 21, wherein generating and displaying the second indicator includes generating and displaying at least one arrow indicating a direction of movement of the simulated bucket to reach the recommended angle.

25. The method of claim 21, wherein modifying the second indicator includes changing at least one selected from a group consisting of color, size, shape, pattern, and animation.

26. The method of claim 21, wherein alerting the operator further includes outputting at least one selected from a group consisting of a text-based warning, an audible warning, and a tactile warning.

* * * * *